(12) United States Patent
Khalid

(10) Patent No.: US 11,080,998 B2
(45) Date of Patent: Aug. 3, 2021

(54) VEHICLE TRAFFIC MANAGEMENT VIA WIRELESS SYSTEM

(71) Applicant: Charter Communications Operating, LLC, St. Louis, MO (US)

(72) Inventor: Saran Khalid, Denver, CO (US)

(73) Assignee: Charter Communications Operating, LLC, St. Louis, MO (US)

(*) Notice: Subject to any disclaimer, the term of this patent is extended or adjusted under 35 U.S.C. 154(b) by 0 days.

(21) Appl. No.: 16/673,577

(22) Filed: Nov. 4, 2019

(65) Prior Publication Data
US 2021/0134151 A1 May 6, 2021

(51) Int. Cl.
*G08G 1/081* (2006.01)
*G08G 1/01* (2006.01)
*H04W 84/18* (2009.01)
*H04W 72/04* (2009.01)
*H04W 56/00* (2009.01)

(52) U.S. Cl.
CPC .......... *G08G 1/081* (2013.01); *G08G 1/0116* (2013.01); *G08G 1/0145* (2013.01); *H04W 56/0015* (2013.01); *H04W 72/042* (2013.01); *H04W 84/18* (2013.01)

(58) Field of Classification Search
CPC .......... G08G 1/00; G08G 1/01; G08G 1/0104; G08G 1/0112; G08G 1/0116; G08G 1/0133; G08G 1/0145; G08G 1/07; G08G 1/081; G08G 1/082; G08G 1/083; G08G 1/09; G08G 1/091; G08G 1/095; G08G 1/0955; G08G 1/005
See application file for complete search history.

(56) References Cited

U.S. PATENT DOCUMENTS

| | | | | |
|---|---|---|---|---|
| 3,764,972 A * | 10/1973 | Siklos | ................... | G08G 1/081 340/915 |
| 4,257,029 A * | 3/1981 | Stevens | ................. | G08G 1/081 340/4.21 |
| 8,665,816 B2 * | 3/2014 | Suzuki | ............. | H04W 72/0406 370/330 |
| 2017/0124867 A1 * | 5/2017 | Paruch | ..................... | G08G 1/07 |
| 2017/0270785 A1 * | 9/2017 | Umehara | ............. | G08G 1/0112 |

(Continued)

*Primary Examiner* — Van T Trieu
(74) *Attorney, Agent, or Firm* — Armis IP Law, LLC

(57) ABSTRACT

A wireless system includes a master communication device in communication with multiple slave communication devices. During operation, the master communication device establishes first wireless connectivity with each of the multiple slave communication devices via a first wireless communication protocol. Each of the slave communication devices monitors vehicular traffic at a street intersection. The master communication device receives input of monitored vehicular traffic from the multiple slave communication devices. The master communication device communicates a status of the vehicular traffic over second wireless connectivity to a wireless base station in communication with a controller. The controller generates and communicates control information based on the detected vehicular traffic to the master communication device that distribute the control information to the slave communication devices. Each of the slave communication devices controls a respective traffic light based on the control information generated by the controller.

37 Claims, 13 Drawing Sheets

(56) References Cited

U.S. PATENT DOCUMENTS

2017/0352263 A1* 12/2017 Umehara ............. G08G 1/0112
2018/0025630 A1* 1/2018 Matsumoto .......... G08G 1/0145
340/909
2018/0376389 A1* 12/2018 Bae ................... H04W 36/0083

* cited by examiner

VEHICLE TRAFFIC MANAGEMENT VIA WIRELESS SYSTEM

BACKGROUND

Traffic lights have long been used to control traffic patterns and flow of vehicular traffic through a street intersection. For example, a conventional traffic light controller typically controls settings of the traffic lights in accordance with a predetermined schedule.

In certain instances, a traffic intersection includes one or more sensor devices that provide feedback as to presence of one or more vehicles in a particular traffic lane. In such an instance, the traffic light controller controls flow of traffic depending on the detected current traffic conditions.

Traditionally, induction coils or timers with fixed wait times or clockwork mechanism are used to regulate traffic flow at an intersection. This usually results in inefficient traffic flow at intersection causing long delay and traffic congestion on streets. Moreover, conventional deployed systems are expensive, bulky, and power hungry.

BRIEF DESCRIPTION OF EMBODIMENTS

In contrast to conventional system, embodiments herein address traffic congestion at intersections via novel implementation of wireless technology. Embodiments as described herein are inexpensive, provide better coverage, and more efficient vehicular traffic flow.

More specifically, according to one embodiment, a wireless network includes a master communication device in communication with multiple slave communication devices. During operation, the master communication device establishes first wireless connectivity with each of the multiple slave communication devices via a first wireless communication protocol. Each of the slave communication devices monitors vehicular traffic at a street intersection. The master communication device receives input of monitored vehicular traffic from the multiple slave communication devices. The master communication device communicates the received status of the vehicular traffic over second wireless connectivity to a wireless base station in communication with a controller. The controller generates and communicates control information based on the detected vehicular traffic to the master communication device that distribute the control information to the slave communication devices. Each of the slave communication devices controls a respective traffic light based on the control information generated by the controller.

In accordance with further embodiments, in response to communicating a status of the vehicular traffic over second wireless connectivity to a wireless base station, the master communication device receives control information from the controller via wireless communications transmitted from the wireless base station to the master communication device. The control information indicates how to control a respective traffic light assigned to each of the multiple slave communication devices. In further example embodiments, the master communication device parses the control information and communicates different portions of the control information to each of the slave communication devices. Via the communicated control information to each of the slave communication devices, on behalf of the controller, the master communication device controls settings of the respective traffic light to which a corresponding slave communication device is assigned to control.

In accordance with further embodiments, the first wireless connectivity supports persistent (always present) connectivity between the master communication device and each of the multiple slave communication devices. If desired, bandwidth (such as time slots, carrier frequency, etc.) can be pre-allocated or pre-scheduled for the first wireless connectivity and/or second wireless connectivity to support desired data flows between the master communication device and the slave communication devices and between the master communication device and the wireless base station. This reduces any delay of wireless communications between the master communication device and the slave communication devices.

In still further example embodiments, establishing first wireless connectivity such as a wireless communication link between the master communication device and each of multiple slave communication devices includes, via the master communication device, i) detecting presence of the multiple slave communication devices in the network environment, each of the slave communication devices assigned a group identifier value served/controlled by the master communication device; ii) requesting allocation of wireless resources for the multiple slave communication devices; and iii) notifying the multiple slave communication devices of the allocation of wireless resources.

In yet further example embodiments, the master communication device acquires synchronization with respect to a wireless network in which the wireless base station resides. Subsequent to synchronizing with the wireless network, the master communication device then synchronizes each of the multiple slave communication devices to the wireless network such that the combination of at least devices operates off a same master clock. Synchronization facilitates more accurate timing control of the one or more traffic lights controlled by the slave communication devices.

The master communication device can be configured to communicate with each of the slave communication devices via any suitable wireless communication protocol. For example, in one non-limiting example embodiment, the first wireless connectivity supports communications in accordance with a D2D (Device-to-Device) protocol.

Note further that the master communication device can be configured to communicate with a respective one or more wireless base stations via any suitable wireless communication protocol. For example, in one non-limiting example embodiment, the second wireless connectivity supports communications in accordance with an LTE (Long Term Evolution) narrow band wireless communication protocol.

In yet further example embodiments, receiving the input of monitored vehicular traffic from the slave communication devices at the master communication device includes: i) receiving first vehicular traffic status information from a first slave communication device of the multiple slave communication devices, the first status information indicating a status of first vehicles traveling in a first direction through a given traffic intersection associated with the master communication device; and ii) receiving second vehicular traffic status information from a second slave communication device of the multiple slave communication devices, the second status information indicating a status of second vehicles traveling in a second direction through the given traffic intersection.

Note that the first status information and the second status information can include any suitable information. For example, in one embodiment, the first status information indicates a number of vehicles in each of multiple lanes traveling in the first direction through the given traffic intersection; the second status information indicates a number of vehicles in each of multiple lanes traveling in the second direction through the given traffic intersection. Different control rules can be applied to controlling flow in the different traffic lanes.

In accordance with further embodiments, a traffic light controller receives first vehicle status information transmitted over first wireless connectivity from a first master communication device that monitors a first street intersection in a wireless network environment. The traffic light controller further receives second vehicle status information transmitted over second wireless connectivity from a second master communication device that monitors a second street intersection in the wireless network environment. Based on the first vehicle status information and the second vehicle status information, the traffic light controller produces traffic light control information to control traffic lights at the first intersection and the second intersection.

In one embodiment, the first vehicle status information includes a compilation of first vehicular traffic status information from a first set of slave communication devices in wireless communication with the first master communication device. The second vehicle status information includes a compilation of second vehicular traffic status information from a second set of slave communication devices in wireless communication with the second master communication device.

In still further example embodiments, the traffic light control information generated by a controller includes first traffic light control information and second traffic light control information. The first traffic light control information controls a first set of traffic lights, the first set of traffic lights residing at the first street intersection; the second traffic light control information controls a second set of traffic lights, the second set of traffic lights residing at the second street intersection. In one embodiment, the first street intersection and the second street intersection reside on the same street, spaced apart from each other.

In yet further example embodiments, the traffic light control information includes first traffic light control information communicated to the first master communication device; the first traffic light control information controls a first set of traffic lights at the first street intersection. The traffic light control information further includes second traffic light control information communicated to the second master communication device; the second traffic light control information controls a second set of traffic lights at the second street intersection.

Note further that, to provide control of corresponding one or more traffic lights, the first master communication device receives messages (such as vehicular traffic status information) from the first set of slave communication devices in accordance with a first wireless communication protocol. The second master communication device receives messages (such as vehicular traffic status information) from the second set of slave communication devices in accordance with the first wireless communication protocol.

In an upstream direction, both the first master communication device and the second master communication device communicate the first vehicular traffic status information and the second vehicular traffic status information to a wireless base station (or different wireless base stations) via a second wireless communication protocol. Each of the one or more wireless base stations communicates this vehicular traffic status information upstream to the traffic light controller.

In a downstream direction, the controller communicates control information to both the first master communication device and the second master communication device through the wireless base station. The first master communication device distributes the received control information downstream to the first set of slave communication devices that control a first set of traffic lights; the second master communication device distributes the received control information downstream to the second set of slave communication devices that control a second set of traffic lights.

Embodiments herein are useful over conventional techniques. For example, embodiments herein include a wireless system that provides a cost effective way of providing dynamic control of one or more traffic lights based on detected corresponding vehicular traffic.

Note that any of the resources as discussed herein can include one or more communication management resources, computerized devices, mobile communication devices, sensors, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon. The instructions, when executed by the computer processor hardware, cause the computer processor hardware (such as one or more co-located or disparately processor devices or hardware) to: establish first wireless connectivity with each of multiple slave communication devices, each of the slave communication devices monitoring vehicular traffic; receive input of monitored vehicular traffic from the multiple slave communication devices; and communicate a status of the vehicular traffic over second wireless connectivity to a wireless base station in communication with a controller that controls the vehicular traffic.

Another embodiment includes a computer readable storage medium and/or system having instructions stored thereon. The instructions, when executed by the computer processor hardware, cause the computer processor hardware (such as one or more co-located or disparately processor devices or hardware) to: receive first vehicle status information transmitted over first wireless connectivity from a first master communication device that monitors a first street intersection in a wireless network environment; receive second vehicle status information transmitted over second wireless connectivity from a second master communication device that monitors a second street intersection in the wireless network environment; and based on the first vehicle status information and the second vehicle status information, producing traffic light control information.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of controlling traffic lights depending on vehicular traffic conditions. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

Figure 1:
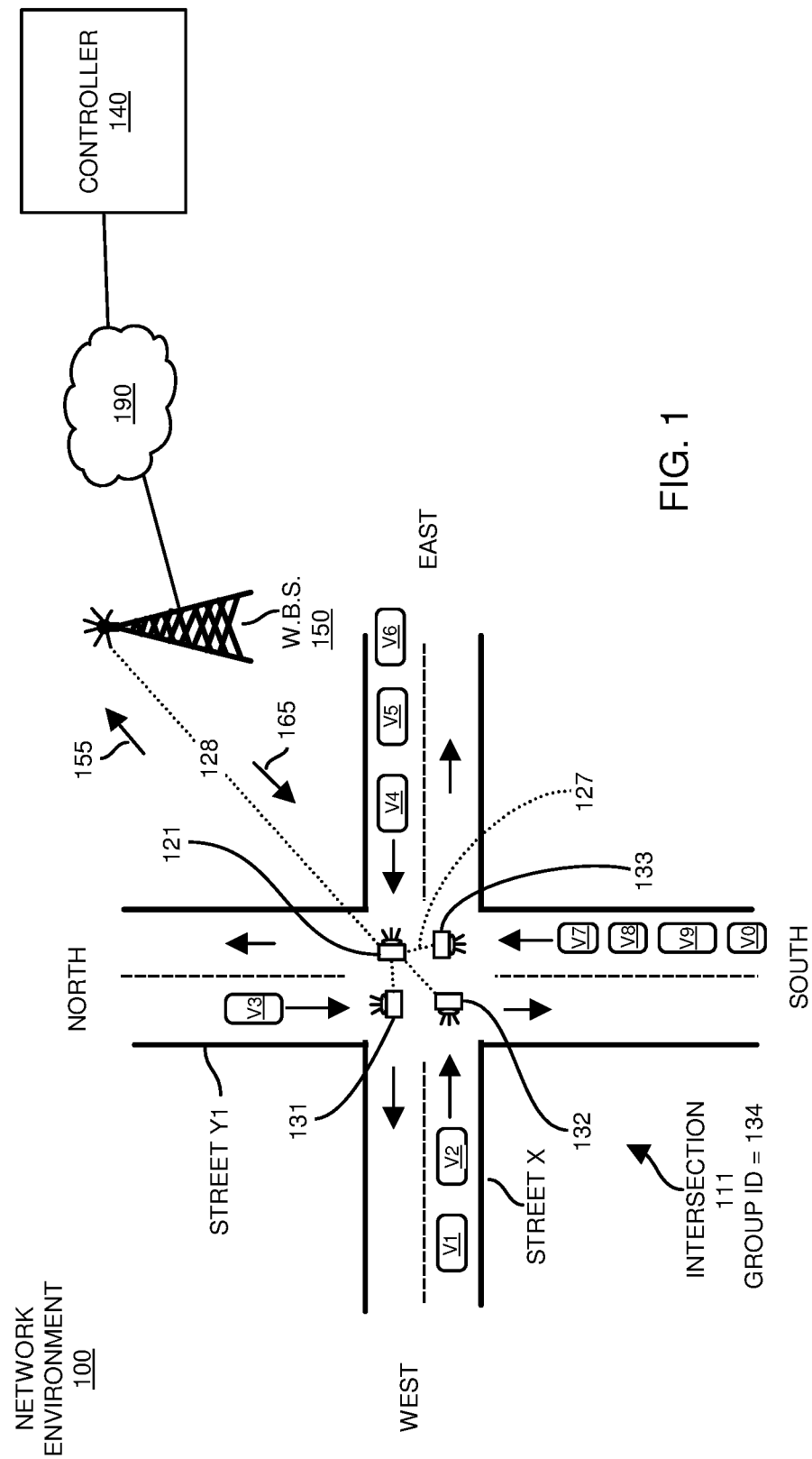
FIG. 1 is an example diagram illustrating a network environment including a traffic intersection controlled via wireless connectivity according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DESCRIPTION OF EMBODIMENTS

According to one embodiment, a wireless system includes a master communication device in communication with multiple slave communication devices. During operation, the master communication device establishes first wireless connectivity with each of the multiple slave communication devices via a first wireless communication protocol. Each of the slave communication devices monitors vehicular traffic at a street intersection. The master communication device receives input of monitored vehicular traffic from the multiple slave communication devices. The master communication device communicates the received status information of the vehicular traffic over second wireless connectivity to a wireless base station in communication with a controller. The controller generates and communicates (in a reverse direction) control information based on the detected vehicular traffic to the master communication device that distribute the control information to the slave communication devices. Each of the slave communication devices controls a respective traffic light based on the control information generated by the controller.

Now, with reference to the drawings, FIG. 1 is an example diagram illustrating a network environment including a traffic intersection controlled via wireless connectivity according to embodiments herein.

As shown, wireless network environment 100 includes multiple communication devices including communication device 121, communication device 131, communication device 132, and communication device 133.

The communication device 121 (such as a master communication device) is in wireless communication with each of the communication devices 131, 132, and 133 (such as slave communication devices) via wireless connectivity 127.

In this example embodiment, the communication devices 121, 131, 132, and 133 (each assigned group ID=134) collectively monitor vehicular traffic at the traffic intersection 111 having assigned group ID=134. The group of communication devices controls traffic flow associated with traffic intersection 111 (also assigned group ID=134).

As shown, monitored traffic intersection 111 includes crossing of street X with street Y1. Each of the street in the traffic intersection 111 can include one or more lanes of traffic in each direction. One or more sets of traffic lights associated with the communication devices 121, 131, 132, and 133 control a flow of vehicular traffic through the traffic intersection 111.

As further shown, the vehicles V1 and V2 are traveling eastbound on street X; the vehicle V3 is traveling southbound on street Y1; the vehicles V4, V5, and V6 are traveling west bound on street X; the vehicles V7, V8, V9, and V0 are traveling north bound on street Y1. Each of the vehicles arrives at the traffic intersection 111 at different times.

In general, during operation, each of the communication devices 121, 131, 132, and 133 monitors a respective flow of vehicular traffic. In one embodiment, as previously discussed, the communication device 121 is a master communication device. Each of the communication devices 131, 132, and 133 are slave communication devices. If a failure occurs, any of the communication devices 131, 132, and 133 can become the master communication device and take over corresponding functions as described herein such communicating collected vehicular traffic status information from each of the slave communication devices and communicating such information to the controller 140.

Note that, in addition to being in communication with each of the communication devices 131, 132, and 133 via the wireless connectivity 127, the communication device 121 is in communication with controller 140 via a corresponding wireless communication link 128 between the communication device 121 and the wireless base station 150.

Note that the wireless connectivity 127 can be established in accordance with any suitable wireless communication protocol. For example, in one non-limiting example embodiment, the first wireless connectivity 127 supports communications in accordance with a D2D (Device-to-Device) protocol.

In accordance with further embodiments, the wireless communication protocol supported by wireless connectivity 127 is a direct communication link between two communication devices (such as between each slave communication device and master communication device) without traversing a respective base station or core network. Such communications over the wireless connectivity 127 are generally non-transparent to the cellular network and they can occur on the cellular frequencies (i.e., inband) or unlicensed spectrum (i.e., outband).

As previously discussed, the communication device 121 can be configured to communicate with a respective wireless base station 150 via any suitable wireless communication protocol. For example, in one non-limiting example embodiment, the second wireless connectivity 128 supports communications in accordance with an LTE (Long Term Evolution) narrow band wireless communication protocol.

In one non-limiting example embodiment, the wireless communication link 128 supports a more specific wireless communication protocol such as Narrowband Internet of Things (NB-IoT). NB-IoT uses a subset of the LTE standard, but limits the bandwidth to a single narrow-band of 200 kHz. It uses OFDM modulation for downlink communication and SC-FDMA for uplink communications.

Subsequent to receiving vehicular traffic status information from each of the communication devices 131, 132, and 133, and collecting vehicular traffic status information itself, the communication device 121 communicates the vehicular traffic status information 155 (collection of vehicular traffic status information from the communication devices 121, 131, 132, and 133) over wireless communication link 128 through wireless base station 150 and network 190 to the controller 140.

Additionally, or alternatively, note that any portion of control functionality associated with the controller 140 can be implemented in the communication device 121 or any of the communication devices. In such an instance, the communication device 121 or a combination of the controller 140 and the communication device 121 control traffic flow though the traffic intersection 111.

In accordance with further embodiments, based on the received vehicular traffic status information 155, the controller 140 makes decisions with respect to the timing and control of the respective vehicular traffic flow through the traffic intersection 111. To control the respective traffic lights associated with communication devices 121, 131, 132, and 133, the controller 140 generates control information 165.

As further discussed below, the controller 140 can be configured to control flow of vehicular traffic through the traffic intersection 111 based on flow of traffic through other adjacent traffic intersections on street X.

In accordance with further embodiments, note that, in response to receiving the vehicular traffic status information 155, the controller 140 generates and subsequently communicates the generated control information 165 in a reverse direction through the network 190 to wireless base station 150. The wireless base station 150 receiving the control information 165 communicates the control information 165 over the wireless communication link 128 to the communication device 121.

Communication device 121, in turn, communicates the appropriate portion of control information 165 to each respective communication device. For example, based on control information 165, the communication device 121 communicates a first portion of the received control information 165 to the communication device 131; the communication device 121 communicates a second portion of the received control information 165 to the communication device 132; the communication device 121 communicates a third portion of the received control information 165 to the communication device 133.

In one embodiment, the communication device 121 uses an appropriate portion of the control information 165 to control operation of one or more traffic lights associated with the communication device 121.

The different portions of control information apply a coordinated set of control such that opposing vehicular traffic does not conflict.

Thus, according to one embodiment, a wireless network environment 100 includes a (master) communication device 121 in communication with multiple (slave) communication devices 131, 132, and 133. During operation, the communication device 121 establishes wireless connectivity 127 with each of the multiple communication devices 131, 132, and 133 via a first wireless communication protocol. Each of the communication devices 131, 132, and 133 monitors vehicular traffic at the street intersection 111.

Via communications from each of the communication devices 131, 132, and 133, the communication device 121 receives input of monitored vehicular traffic at the traffic intersection 111. As previously discussed, the communication device 121 communicates a status of the vehicular traffic over second wireless connectivity 128 to a wireless base station 128 in communication with the controller 140. The controller 140 receives the vehicular traffic status information 155 and, in turn, generates and communicates control information 165 based on the detected vehicular traffic to the master communication device 121. Communication device 121 distributes the control information 165 or appropriate portions thereof to the slave communication devices. Each of the slave communication devices and master communication device controls a respective one or more traffic light assembly based on the control information generated by the controller.

Figure 2:
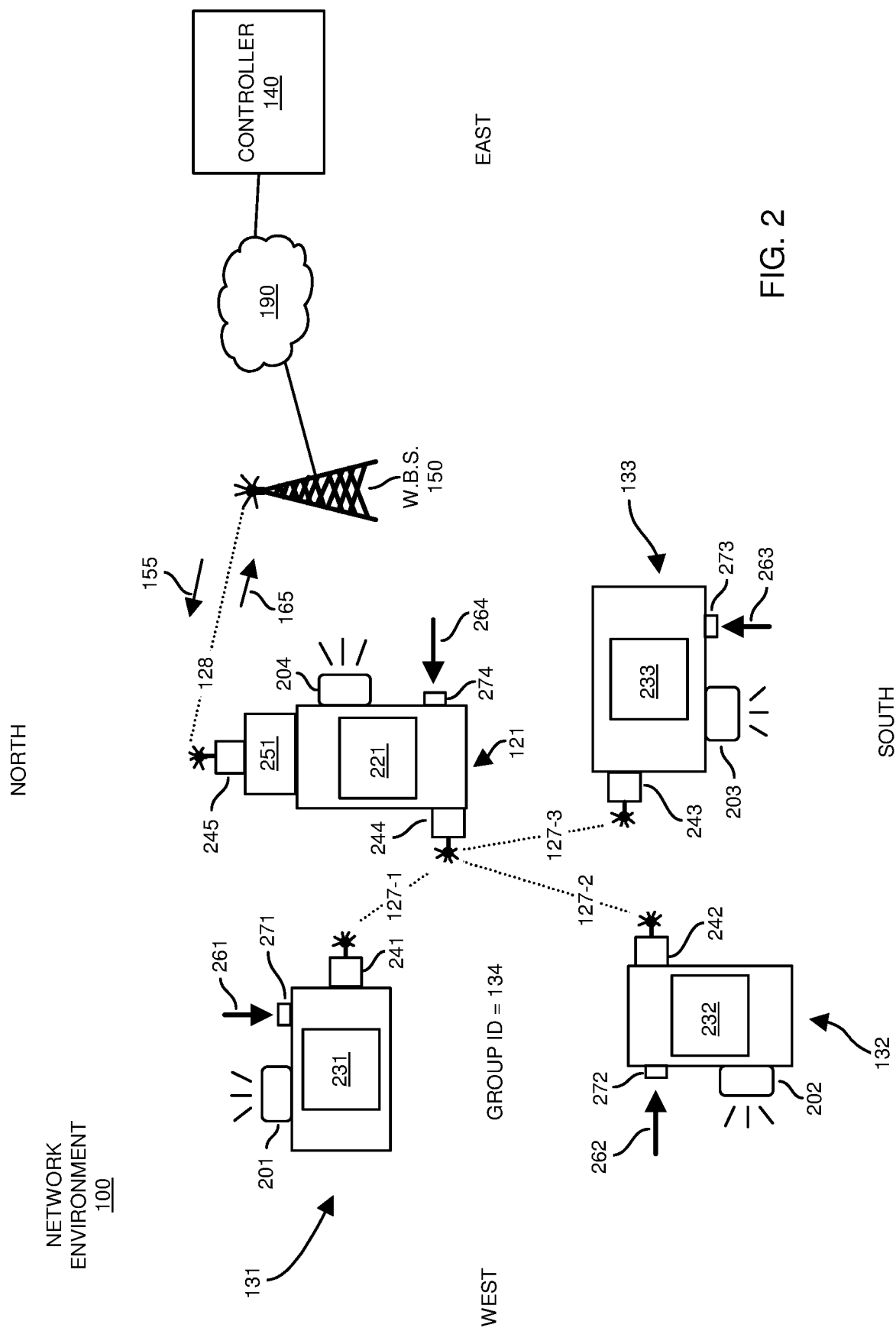
FIG. 2 is an example diagram illustrating details of wireless connectivity and communications according to embodiments herein.

FIG. 2 is an example diagram illustrating details of wireless connectivity and communications according to embodiments herein.

This example embodiment illustrates more details of each communication device present in network environment 100.

For example, as shown, communication device 131 (assigned group ID=134 associated with traffic intersection 111) includes camera device 271, traffic light assembly 201 (one or more sets of traffic lights such as a red light, yellow light, green light, etc.), management resource 231, and wireless interface 241. The camera device 271 is operative to detect images (via input 261 such as optical signals) of vehicles traveling southbound on street Y1 towards traffic intersection 111. The wireless interface 241 supports wireless communications over wireless communication link 127-1 with the wireless interface 244 associated with communication device 121. In accordance with further embodiments, management resource 231 processes images detected via camera 271 and communicates respective vehicular traffic status information (such as detection of each vehicle and a time when the vehicle is detected via camera 271) over the wireless connectivity 127-1 (such as one or more wireless channels) to the communication device 121.

Communication device 132 (assigned group ID=134) includes camera device 272, traffic light assembly 202 (one or more traffic lights such as a red light, yellow light, green light, arrows, etc.), management resource 232, and wireless interface 242. The camera device 272 is operative to detect images (via input 262 such as optical signals) of vehicles traveling eastbound on street X towards traffic intersection 111. The wireless interface 242 supports wireless communications with the wireless interface 244 associated with communication device 121. Management resource 232 processes images detected via camera 272 and communicates respective vehicular traffic status information (such as detection of each vehicle and a corresponding time when the vehicle is detected via camera 272) over the wireless connectivity 127-2 (such as one or more wireless channels) to the communication device 121.

Communication device 133 (assigned group ID=134) includes camera device 273, traffic light assembly 203 (one or more traffic lights such as a red light, yellow light, green light, arrows, etc.), management resource 233, and wireless interface 243. The camera device 273 is operative to detect images (via input 263 such as optical signals) of vehicles traveling northbound on street Y1 towards traffic intersection 111. The wireless interface 243 supports wireless communications with the wireless interface 244 associated with communication device 121. Management resource 233 processes images detected via camera 273 and communicates respective vehicular traffic status information (such as detection of each vehicle and a respective time when the vehicle is detected via camera 273) over the wireless connectivity 127-3 (such as one or more wireless channels) to the communication device 121.

Communication device 121 (assigned group ID=134) includes camera device 274, traffic light assembly 204 (one or more traffic lights such as a red light, yellow light, green light, arrows, etc.), management resource 221, and wireless interface 244. The camera device 274 is operative to detect images (via input 264 such as optical signals) of vehicles traveling westbound on street X towards traffic intersection 111. The wireless interface 244 supports wireless communications with each of the wireless interfaces 241, 242, and 243 associated with communication device 121. Management resource 221 processes images detected via camera 274 and stores respective vehicular traffic status information (such as detection of each vehicle and a respective time when the vehicle is detected via camera 274).

Note that the communication device 121 (configured as a master communication device) further includes wireless interface 245 supporting wireless communications with wireless base station 150.

Figure 5:
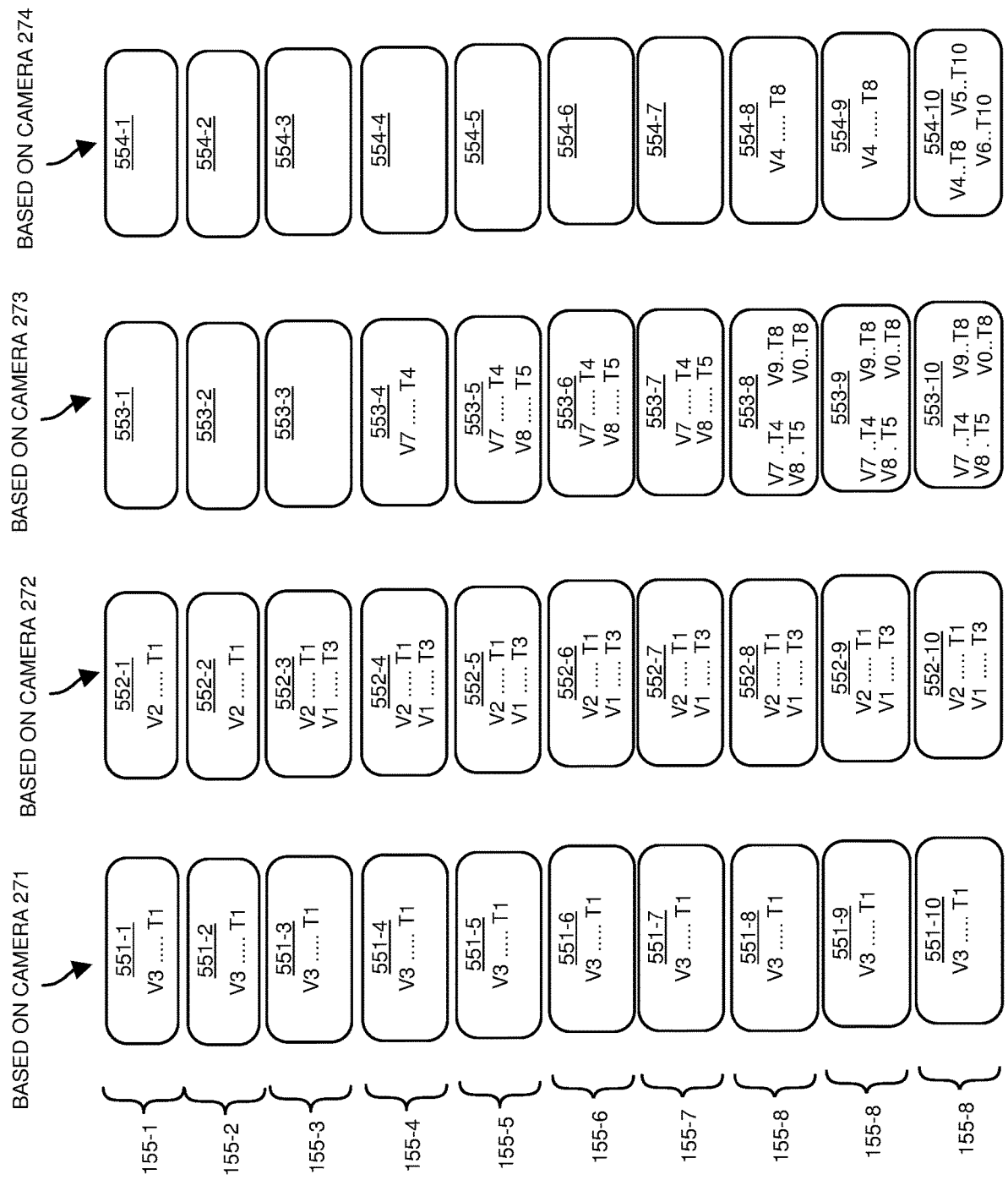
FIG. 5 is an example diagram illustrating vehicular traffic status information associated with a first set of communication devices according to embodiments herein.

In one embodiment, as previously discussed, the management resource 221 associated with the communication device 121 collects vehicular traffic status information (over wireless connectivity 127) from each of the communication devices 131, 132, and 133. The wireless interface 245 communicates the collected vehicular traffic status information 155 (as well as vehicular traffic status information collected by itself) over the wireless connectivity 128 (such as one or more wireless channels) to the wireless base station 150. The wireless base station 150 communicates the vehicular traffic status information 155 (such as shown in FIG. 5) over network 190 to the controller 140.

Figure 6:
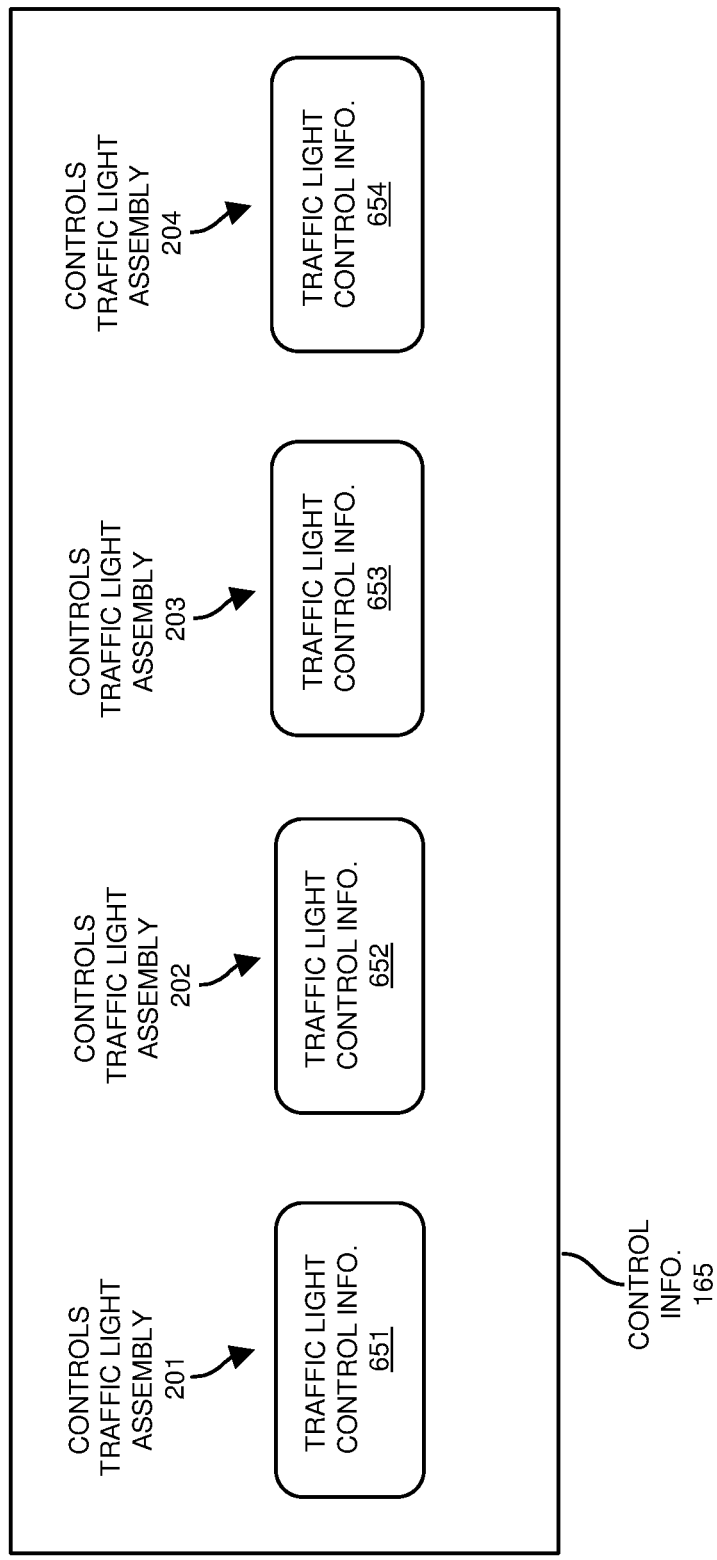
FIG. 6 is an example diagram illustrating generation and distribution of control information in a wireless network environment according to embodiments herein.

In yet further example embodiments, the controller 140 produces control information 165 (such as shown in FIG. 6) indicating how to control each of the sets of traffic lights (such as traffic light assembly 201, 202, 203, and 204).

Note that, in an autonomous mode, or any other suitable mode, the communication device 121 becomes a synchronization source via synchronization of the communication device 121 to the wireless base station 150 and corresponding wireless network.

The communication device 121 transmits a synchronization signal or signals in wireless network environment 100 (such as over wireless connectivity 127) based on synchronization with the wireless base station 150 and corresponding supported wireless network.

In accordance with further embodiments, the other communication devices 131, 132, and 133 detect presence of the synchronization signal broadcasted from the (master) communication device 121. In one embodiment, synchronization is obtained using a so-called Sidelink Synchronization signal (SLSS) communicated from the communication device 121.

Note that the synchronization signal(s) from the communication device 121 can be configured to include any suitable information or parameters such as Group ID=134 (indicating the group of pre-configured communication devices controlled by the master), multicast addresses, and security information to be used by the recipient to support wireless communications with the communication device 121 over wireless connectivity 127. Communication of the group ID provides the communication devices 131, 132, and 133 notification of which intersection the master communication device 121 is assigned to control.

In accordance with further embodiments, the communication device 121 implements a discovery request and discovery response message exchange to discover other devices in the vicinity of the master communication device 121. For example, to discover a respective one or more communication devices, the communication device 121 transmits a discovery request to any communication devices assigned a group ID=134. Via communications from the devices that respond because they are assigned the group ID=134, the communication device 121 learns of a specific unique identifier value assigned to each responding communication device.

In accordance with further embodiments, each of the fixed communication devices discover and share traffic information which is used to update timer information.

Figure 3:
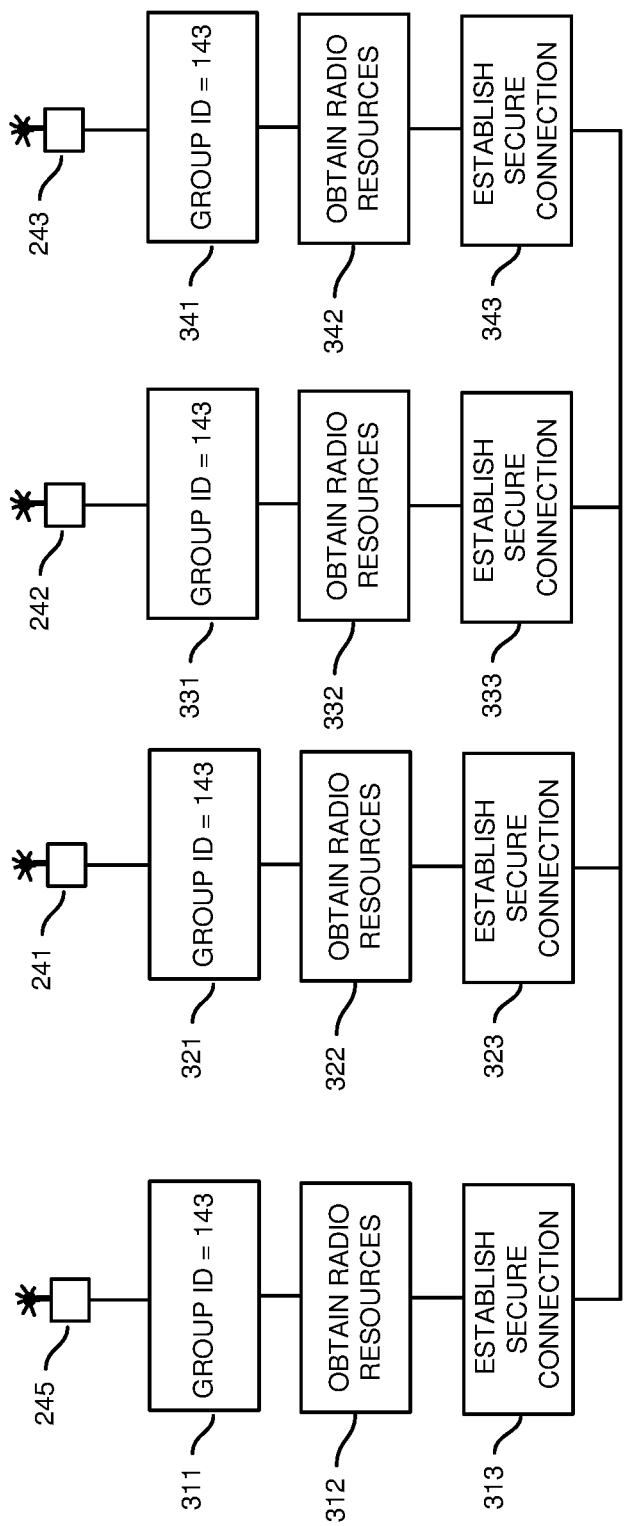
FIG. 3 is an example diagram illustrating discovery and establishment of wireless connectivity amongst multiple communication devices at a first traffic intersection according to embodiments herein.

D2D message flow is shown in FIG. 3. This message flow is defined for all of the devices. This example shows communication device 121 to each of the communication devices 131, 132, and 133.

In yet further example embodiments, the (master) communication device 121 (such as a fixed USER EQUIPMENT) will distribute pre-configured parameters to the rest of the communication devices 131, 132, and 133. As previously discussed, in the event of master communication device 121 experiencing a failure, another communication device becomes the master communication device and executes respective functions as described herein.

Figure 4:
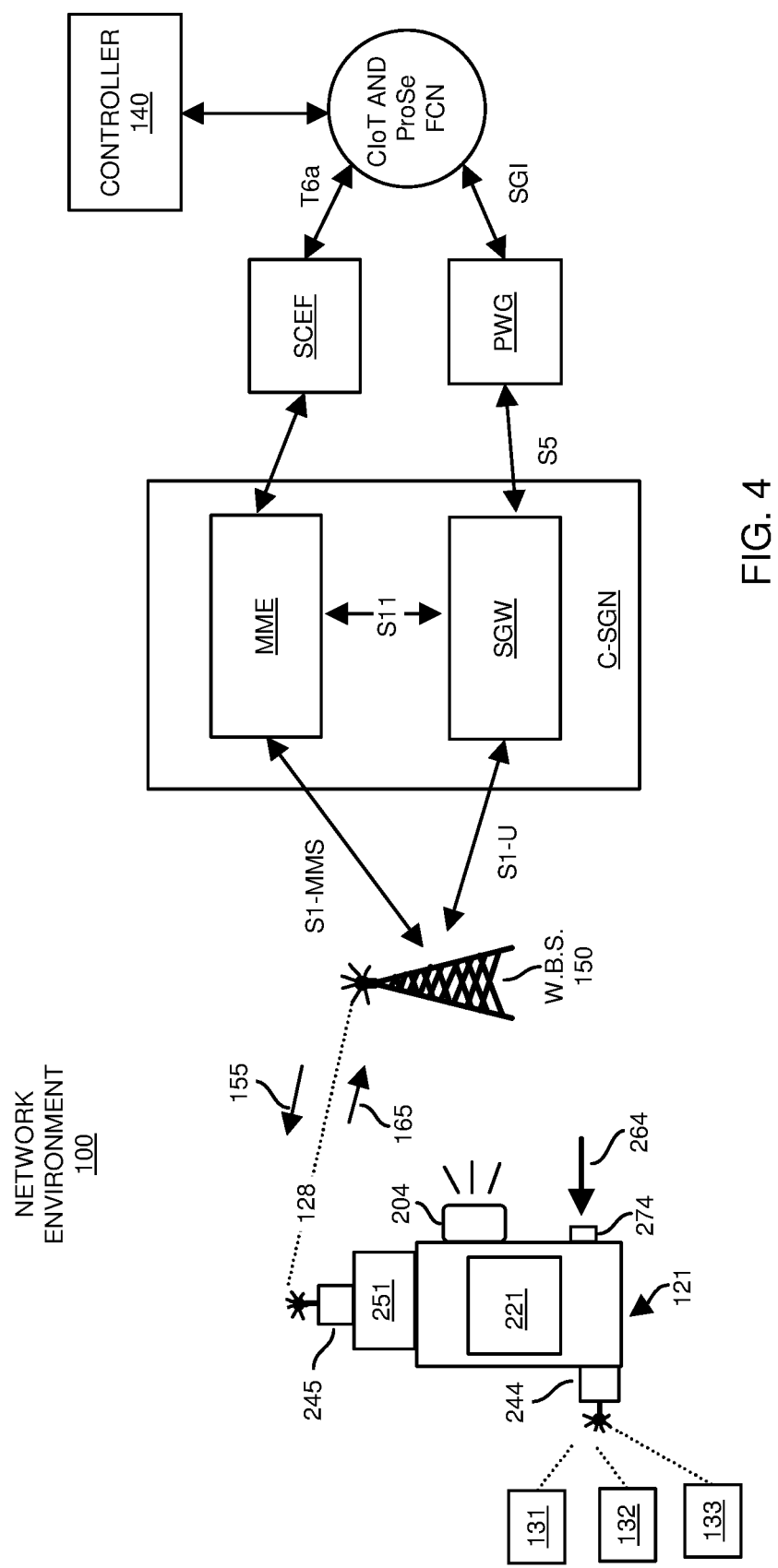
FIG. 4 is an example diagram illustrating a wireless base station and details of respective wireless connectivity with a controller according to embodiments herein.

To transfer the data to a central location for further processing, statistics, and manual control, the wireless connectivity 128 supports NB-IoT (Narrow Band Internet of Things) to the wireless base station 150. In one embodiment, the implementation of the wireless connectivity 128 includes use of NB-IoT signaling messages instead of regular LTE messages. This allows for infrequent and small data transfers in a fast and very efficient manner. Further implementation of the wireless communication link 128 via NB-IoT is shown in FIG. 4.

Referring again to FIG. 3, in one embodiment, each of the cameras (271, 272, 273, and 274) is capable of digital image processing (based on respective received optical signals such as input 261, input 262, input 263, and input 264) and identifies vehicles in respective one or more lanes of corresponding monitored vehicular traffic.

In one embodiment, the respective management resource of a communication device produces a matrix (queues) indicating a number of vehicles in each lane being monitored as well as a time in which each vehicle is detected as being present at the traffic intersection 111 waiting to proceed through it.

In one embodiment, each of the management resources in respective communication devices generates a table (vehicular traffic status information) in which a logic high indicates presence of a vehicle, logic 0 indicates absence of a vehicle. When used, these matrices are maintained in the data base locally and transmitted to a central station.

In one embodiment, these tables (vehicular traffic status information) are shared among communication devices. Corresponding traffic light assemblies are controlled via a priority based on the weight and number of cars indicated by the vehicular traffic status information (such as a matrix).

In accordance with still further embodiments, a timer is set off (with a fixed maximum), this timer can be weighed based on traffic. If there are no cars, there will be no timer.

Further embodiments herein include assigning two weights, one to assign a priority to a road and the other weight being based on overall magnitude of vehicles detected in a respective lane within a specified time window are assigned to each traffic light controller.

As an example, assume that the street X going east-west is assigned a priority 2 while the street Y1 is assigned a priority of 1.

Further assume that there are 10 cars on East-West traffic intersection 111. In such an instance, this assigns the traffic priority of 10/10=1. Similarly, assuming 5 cars going North-South on street Y1 would have a traffic priority of 5/10=0.5. Plugging the numbers into the equation below gives us 2 minutes of green light time for the East-West road and then it switches to providing a green light condition to the North-South for ½ minute, assuming phasor priority=1.

Green light time=(Phasor priority/trigger)*(Road priority weight)*(Traffic Priority)*Pre-determined wait time.

In accordance with further embodiments, the table (vehicular traffic status information) is then updated with new numbers for a given image/time window. These tables are recorded centrally to keep track of traffic flow as well as to create traffic phasors. This must be coordinated between the lights at the intersection to avoid conflict.

FIG. 3 is an example diagram illustrating discovery and establishment of wireless connectivity amongst multiple communication devices at a first traffic intersection according to embodiments herein.

In this example embodiment, each of the communication devices 131 and corresponding wireless interfaces 245, 241, 242, and 243 determines (in respective operations 311, 312, 313, and 314) a respective unique identifier group to which the device belongs, obtains (in respective operations 311, 312, 313, and 314) appropriate radio resources available in the wireless network environment 100, and establishes (in respective operations 311, 312, 313, and 314) a secure wireless communication link with the communication device 121.

As described herein, the establishment of the wireless connectivity 127 supports efficient D2D communications between each of the communication devices 131, 132, and 133, and the communication device 121.

FIG. 4 is an example diagram illustrating a wireless base station and details of respective wireless connectivity with a controller according to embodiments herein.

In this example embodiment, the network 190 include an MME (Mobile Management Entity), SGW (Serving Gateway), SCEF (Service Capability Exposure Function), PWG (PDN Gateway), and CIoT (Cellular Internet of Things) and ProSe (Proximity-based Services) function to support wireless connectivity between the communication device 121 through wireless base station 150 and the controller 140 in a manner as previously discussed.

FIG. 5 is an example diagram illustrating vehicular traffic status information associated with a first set of communication devices according to embodiments herein.

In this example embodiment, the vehicular traffic status information 155 includes vehicle information derived from monitoring each of the cameras 271, 272, 273, and 274.

Assume that the time stamp values such as T1, T2, T3, T4, T5, T6, T7, T8, T9, and T10, (such as spaced apart by a delay time of 250 milliseconds each) represent different sample times at which each of the communication devices 131, 132, 133, and 121 determine what vehicles are present in a monitored traffic lane.

For example, relative to a reference value of 0.0 seconds, each of the communication devices samples presence of vehicles at: time T1=0.25 seconds; time T2=0.5 seconds;

time T3=0.75 seconds; time T4=1.0 seconds; time T5=1.25 seconds; time T6=1.5 seconds; time T7=1.75 seconds; time T8=2.00 seconds; time T9=2.25 seconds; time T10=2.5 seconds; etc.

As the different communication devices detect a respective vehicle in a sample time in a respective monitored traffic lane, the communication device records detected vehicles (possibly including their identity) in a respective queue (vehicular traffic status information) as well as corresponding time when the vehicle is detected. Tracking of time enables the controller 140 to know how long a respective vehicle has been waiting in the traffic intersection 111.

For example, at time T1, assume that the communication device 131 reports vehicular traffic status information 551-1 (vehicle V3 detected at sample time 0.25) to the communication device 121; communication device 132 reports vehicular traffic status information 552-1 (vehicle V2 detected at sample time 0.25) to the communication device 121; communication device 133 reports vehicular traffic status information 553-1 (no vehicle detected at sample time 0.25) to the communication device 121. Communication device 121 produces vehicular traffic status information 554-1 (no vehicle detected at sample time 0.25).

For time T1 samples, the communication device 121 communicates a combination of the vehicular traffic status information 155-1 (vehicular traffic status information 551-1, 552-2, 553-1, and 554-1) over the wireless communication link 128 to the controller 140.

At time T2, communication device 131 reports vehicular traffic status information 551-2 to the communication device 121; communication device 132 reports vehicular traffic status information 552-2 to the communication device 121; communication device 133 reports vehicular traffic status information 553-2 to the communication device 121. Communication device 121 produces vehicular traffic status information 554-2.

For time T2 samples, the communication device 121 communicates a combination of the vehicular traffic status information 155-2 (vehicular traffic status information 551-2, 552-2, 553-2, and 554-2 over the wireless communication link 128 to the controller 140.

At time T3, communication device 131 reports vehicular traffic status information 551-3 to the communication device 121; communication device 132 reports vehicular traffic status information 552-3 (including newly detected vehicle V1) to the communication device 121; communication device 133 reports vehicular traffic status information 553-3 to the communication device 121. Communication device 121 produces vehicular traffic status information 554-3.

For time T3 samples, the communication device 121 communicates a combination of the vehicular traffic status information 155-3 (vehicular traffic status information 551-3, 552-3, 553-3, and 554-3 over the wireless communication link 128 to the controller 140.

At time T4 communication device 131 reports vehicular traffic status information 551-4 to the communication device 121; communication device 132 reports vehicular traffic status information 552-4 to the communication device 121; communication device 133 reports vehicular traffic status information 553-4 (including newly detected vehicle V7) to the communication device 121. Communication device 121 produces vehicular traffic status information 554-4.

For time T4 samples, the communication device 121 communicates a combination of the vehicular traffic status information 155-4 (vehicular traffic status information 551-4, 552-4, 553-4, and 554-4 over the wireless communication link 128 to the controller 140.

At time T5, communication device 131 reports vehicular traffic status information 551-5 to the communication device 121; communication device 132 reports vehicular traffic status information 552-5 to the communication device 121; communication device 133 reports vehicular traffic status information 553-5 (including newly detected vehicle V8) to the communication device 121. Communication device 121 produces vehicular traffic status information 554-5.

For time T5 samples, the communication device 121 communicates a combination of the vehicular traffic status information 155-5 (vehicular traffic status information 551-5, 552-5, 553-5, and 554-5 over the wireless communication link 128 to the controller 140.

At time T6, communication device 131 reports vehicular traffic status information 551-6 to the communication device 121; communication device 132 reports vehicular traffic status information 552-6 to the communication device 121; communication device 133 reports vehicular traffic status information 553-6 to the communication device 121. Communication device 121 produces vehicular traffic status information 554-6.

For time T6 samples, the communication device 121 communicates a combination of the vehicular traffic status information 155-6 (vehicular traffic status information 551-6, 552-6, 553-6, and 554-6 over the wireless communication link 128 to the controller 140.

At time T7, communication device 131 reports vehicular traffic status information 551-7 to the communication device 121; communication device 132 reports vehicular traffic status information 552-7 to the communication device 121; communication device 133 reports vehicular traffic status information 553-7 to the communication device 121. Communication device 121 produces vehicular traffic status information 554-7.

For time T7 samples, the communication device 121 communicates a combination of the vehicular traffic status information 155-7 (vehicular traffic status information 551-7, 552-7, 553-7, and 554-7 over the wireless communication link 128 to the controller 140.

At time T8, communication device 131 reports vehicular traffic status information 551-8 to the communication device 121; communication device 132 reports vehicular traffic status information 552-8 to the communication device 121; communication device 133 reports vehicular traffic status information 553-8 to the communication device 121. Communication device 121 produces vehicular traffic status information 554-8.

For time T8 samples, the communication device 121 communicates a combination of the vehicular traffic status information 155-8 (vehicular traffic status information 551-8, 552-8, 553-8, and 554-8 over the wireless communication link 128 to the controller 140.

At time T9, communication device 131 reports vehicular traffic status information 551-9 to the communication device 121; communication device 132 reports vehicular traffic status information 552-9 to the communication device 121; communication device 133 reports vehicular traffic status information 553-9 to the communication device 121. Communication device 121 produces vehicular traffic status information 554-9.

For time T9 samples, the communication device 121 communicates a combination of the vehicular traffic status information 155-9 (vehicular traffic status information 551-9, 552-9, 553-9, and 554-9 over the wireless communication link 128 to the controller 140.

At time T10, communication device 131 reports vehicular traffic status information 551-10 to the communication device 121; communication device 132 reports vehicular traffic status information 552-10 to the communication device 121; communication device 133 reports vehicular traffic status information 553-10 to the communication device 121. Communication device 121 produces vehicular traffic status information 554-10.

For time T10 samples, the communication device 121 communicates a combination of the vehicular traffic status information 155-10 (vehicular traffic status information 551-10, 552-10, 553-10, and 554-10 over the wireless communication link 128 to the controller 140.

In this manner, based on received vehicular traffic status information 155, the controller 140 is aware of the duration of time that each of the vehicles in respective queues is present at the intersection 111 and waiting to go forward through the traffic intersection 111. In one embodiment, the controller 140 controls flow of traffic based on the duration of time and number of vehicles in each particular lane.

As previously discussed, note again that control functionality such as controller 140 can reside in the communication device 121 instead of being remotely located with respect to the communication device 121.

FIG. 6 is an example diagram illustrating generation and distribution of control information in a wireless network environment according to embodiments herein.

In one embodiment, based on receiving the vehicular traffic status information 155, the controller produces control information 165. The control information can be any suitable information used to control respective traffic light assemblies associated with the communication devices.

In this example embodiment, the control information 165 includes: i) traffic light control information 651 that controls traffic light assembly 201, ii) traffic light control information 652 that controls traffic light assembly 202, iii) traffic light control information 653 that controls traffic light assembly 203, iv) traffic light control information 654 that controls traffic light assembly 204.

In one embodiment, upon receipt of the control information 165, the communication device 121 forwards traffic light control information 651 to communication device 131 that uses the control information to control traffic lights associated with traffic light assembly 201; the communication device 121 forwards traffic light control information 652 to communication device 132 that uses such information to control traffic lights associated with traffic light assembly 202; the communication device 121 forwards traffic light control information 653 to communication device 133 that uses such information to control traffic lights associated with traffic light assembly 202; the communication device 121 uses traffic light control information 654 to control traffic lights associated with traffic light assembly 204.

Additionally, or alternatively, note that the traffic light control information 165 can be rules applied individually or collectively by the communication devices 121, 131, 132, and 133.

Figure 7:
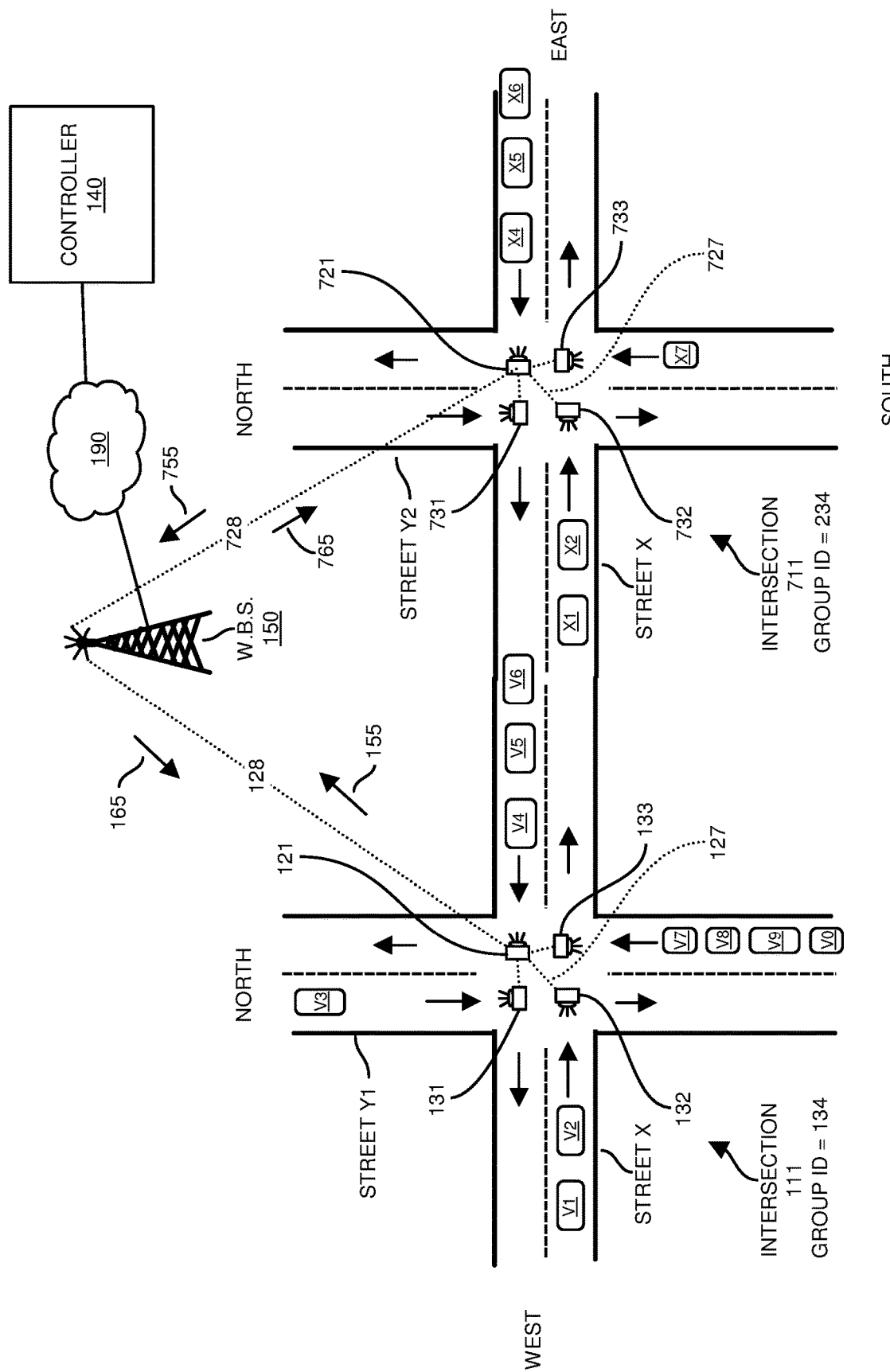
FIG. 7 is an example diagram illustrating monitoring and control of multiple traffic intersections according to embodiments herein.

FIG. 7 is an example diagram illustrating monitoring and control of multiple traffic intersections according to embodiments herein.

As shown in this example embodiment, wireless network environment 100 includes multiple communication devices including communication device 721, communication device 731, communication device 732, and communication device 733.

The communication device 721 (such as a master communication device) is in wireless communication with each of the communication devices 731, 732, and 733 (such as slave communication devices) via wireless connectivity 727.

In this example embodiment, the communication devices 721, 731, 732, and 733 (each assigned group ID=234) collectively monitor the traffic intersection 711 having assigned group ID=234. The group of communication devices controls traffic flow associated with traffic intersection 711 (also assigned group ID=234).

Monitored traffic intersection 711 includes crossing of street X with street Y2. Each of the street in the traffic intersection 711 can include one or more lanes of traffic in each direction. Traffic lights associated with the communication devices 721, 731, 732, and 733 control a flow of vehicular traffic through the traffic intersection 711.

As further shown, the vehicles X1 and X2 are traveling eastbound on street X; no vehicle is traveling southbound on street Y2; the vehicles X4, X5, and X6 are traveling west bound on street X; the vehicle X7 is traveling north bound on street Y2. Each of the vehicles arrives at the traffic intersection 711 at different times.

In general, during operation, in a similar manner as previously discussed, each of the communication devices 721, 731, 732, and 733 monitors a respective flow of vehicular traffic.

In yet further example embodiments, the communication device 721 is a master communication device. Each of the communication devices 731, 732, and 733 are slave communication devices. If a failure occurs, any of the communication devices 731, 732, and 733 can become the master communication device and take over corresponding functions as described herein.

Note that, in addition to being in communication with each of the communication devices 731, 732, and 733 via the wireless connectivity 727, the communication device 721 is in communication with controller 140 via a corresponding wireless communication link 728 between the communication device 721 and the wireless base station 150.

Note that the wireless connectivity 727 can be established in accordance with any suitable wireless communication protocol. For example, in one non-limiting example embodiment, the first wireless connectivity 727 supports communications in accordance with a D2D (Device-to-Device) protocol.

The communication device 721 can be configured to communicate with a respective wireless base station 150 via any suitable wireless communication protocol. For example, in one non-limiting example embodiment, the second wireless connectivity 728 supports communications in accordance with an LTE (Long Term Evolution) narrow band wireless communication protocol.

Subsequent to receiving vehicular traffic status information from each of the communication devices 731, 732, and 733, and collecting vehicular traffic status information itself, the communication device 121 communicates the vehicular traffic status information 755 (collection of vehicular traffic status information from the communication devices 721, 731, 732, and 733) over wireless communication link 728 through wireless base station 150 and network 190 to the controller 140. Additionally, or alternatively, note that any portion of control functionality associated with the controller 140 can be implemented in the communication device 721. In such an instance, the communication device 721 or a combination of the controller 140 and the communication device 721 control traffic flow though the traffic intersection 711.

In accordance with further embodiments, based on the received vehicular traffic status information 755, the controller 140 makes decisions with respect to the timing and control of the respective vehicular traffic flow through the traffic intersection 711. To control the respective traffic lights associated with communication devices 721, 731, 732, and 733, the controller 140 generates control information 765. As further discussed below, the controller 140 can be configured to control flow of vehicular traffic through the traffic intersection 711 based on flow of traffic through other adjacent traffic intersections on street X.

In accordance with further embodiments, note that, in response to receiving the vehicular traffic status information 755, the controller 140 generates and communicates the generated control information 765 in a reverse direction through the network 190 to wireless base station 150. The wireless base station 150 receiving the control information 765 communicates the control information 765 over the wireless communication link 728 to the communication device 721.

Communication device 721, in turn, communicates the appropriate portion of control information 765 to each respective communication device. For example, based on control information 765, the communication device 721 communicates a first portion of control information 765 to the communication device 731; the communication device 721 communicates a second portion of control information 765 to the communication device 732; the communication device 721 communicates a third portion of control information 765 to the communication device 733. In one embodiment, the communication device 721 uses an appropriate portion of the control information 765 to control operation of one or more traffic lights associated with the communication device 721.

The different portions of control information apply a coordinated set of control such that opposing vehicular traffic does not conflict.

Thus, according to one embodiment, a wireless network environment 100 includes a (master) communication device 721 in communication with multiple (slave) communication devices 731, 732, and 733. During operation, the communication device 721 establishes wireless connectivity 727 with each of the multiple communication devices 731, 732, and 733 via a first wireless communication protocol. Each of the communication devices 731, 732, and 733 monitors vehicular traffic at the street intersection 711. Via communications from each of the communication devices 731, 732, and 733, the communication device 721 receives input of monitored vehicular traffic at the traffic intersection 711. As previously discussed, the communication device 721 communicates a status of the vehicular traffic over second wireless connectivity 728 to a wireless base station 728 in communication with the controller 140. The controller 140 receives the vehicular traffic status information 755 and, in turn, generates and communicates control information 765 based on the detected vehicular traffic to the master communication device 721. Communication device 721 distributes the control information 765 to the slave communication devices. Each of the slave communication devices and master communication device controls a respective traffic light based on the control information generated by the controller.

Thus, in accordance with further embodiments, a traffic light controller 140 receives first vehicle status information 155 transmitted over first wireless connectivity 127 from a first master communication device 121 that monitors a first street intersection 111 in a wireless network environment 100. The traffic light controller 140 further receives second vehicle status information 165 transmitted over second wireless connectivity 727 from a second master communication device 721 that monitors a second street intersection 711 (assigned group ID=234) in the wireless network environment 100. Based on the first vehicle status information 155 and the second vehicle status information 165, the traffic light controller 140 produces traffic light control information 165 and 765 to control traffic lights at the first intersection 111 and the second intersection 711.

In one embodiment, the first vehicle status information 155 includes a compilation of first vehicular traffic status information from a first set of slave communication devices 131, 132, and 133 in wireless communication with the first master communication device 121. The second vehicle status information 755 includes a compilation of second vehicular traffic status information from a second set of slave communication devices 731, 732, and 733 in wireless communication with the second master communication device 721.

In still further example embodiments, the traffic light control information generated by the controller 140 includes first traffic light control information 165 and second traffic light control information 765. The first traffic light control information 165 controls a first set of traffic lights (201, 202, 203, and 204), the first set of traffic lights residing at the first street intersection 111; the second traffic light control information 765 controls a second set of traffic lights (801, 802, 803, and 804), the second set of traffic lights residing at the second street intersection 711. In one embodiment, the first street intersection 111 and the second street intersection 711 reside on the same street X, spaced apart from each other.

As previously discussed, to provide control of corresponding one or more traffic lights, the first master communication device 121 receives messages (such as vehicular traffic status information) from the first set of slave communication devices 131, 132, and 133 in accordance with a first wireless communication protocol (such as D2D or other suitable wireless communication protocol). The second master communication device receives messages (such as vehicular traffic status information) from the second set of slave communication devices 731, 732, and 733 in accordance with the first wireless communication protocol (such as D2D other suitable wireless communication protocol).

In an upstream direction, both the first master communication device 121 and the second master communication device 721 communicate the first vehicular traffic status information 155 and the second vehicular traffic status information 165 to a wireless base station 150 via a second wireless communication protocol (such as a NB-IoT other suitable wireless communication protocol. The wireless base station communicates this vehicular traffic status information upstream to the traffic light controller 140.

In a downstream direction, the controller 140 communicates control information to both the first master communication device 121 and the second master communication device 721 through the wireless base station 150. The first master communication device distributes the received control information 165 downstream to the first set of slave communication devices that control the first set of traffic lights (at traffic intersection 111); the second master communication device 721 distributes the received control information 765 downstream to the second set of slave communication devices that control a second set of traffic lights (at the traffic intersection 711).

In areas with traffic lights at multiple intersections within a few blocks. It is desirable to keep the flow of traffic on high priority roads continuous to avoid congestion. Embodiments herein include monitoring detected traffic associated with multiple traffic intersections and controlling flow of same.

In order to coordinate flow through different adjacent intersections, a method including phases is introduced. Phases are vectors in a given direction that assume a value and direction based on number of cars between intersections, their speed as a group. These phases will set off a 0/1 based weights based on their magnitude and accordingly switch the lights to green to let groups of cars go through a succession of intersections.

Figure 8:
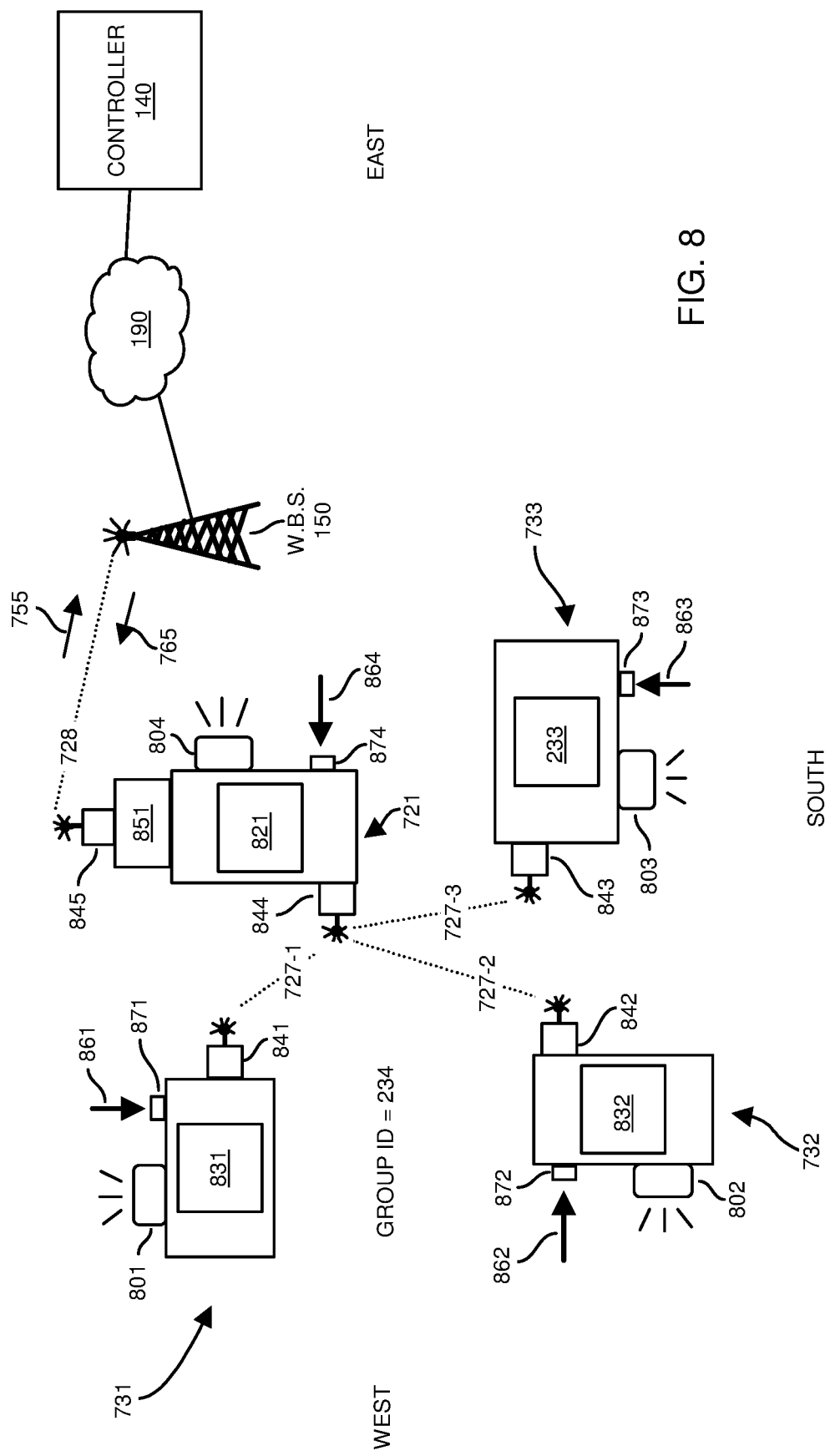
FIG. 8 is an example diagram illustrating a wireless base station and details of respective wireless connectivity with a controller according to embodiments herein.

FIG. 8 is an example diagram illustrating a wireless base station and details of respective wireless connectivity with a controller according to embodiments herein.

This example embodiment illustrates more details of each communication device present in network environment 100.

For example, as shown, communication device 731 (assigned group ID=234 associated with traffic intersection 711) includes camera device 871, traffic light assembly 801 (one or more traffic lights such as a red light, yellow light, green light, etc.), management resource 831, and wireless interface 841. The camera device 871 is operative to detect images (via input 861 such as optical signals) of vehicles traveling southbound on street Y1 towards traffic intersection 111. The wireless interface 841 supports wireless communications over wireless connectivity 727-1 with the wireless interface 844 associated with communication device 721. Management resource 831 processes images detected via camera 871 and communicates respective vehicular traffic status information (such as detection of each vehicle and a time when the vehicle is detected via camera 871) over the wireless connectivity 727-1 (such as one or more wireless channels) to the communication device 721.

Communication device 732 (assigned group ID=234) includes camera device 872, traffic light assembly 802 (one or more traffic lights such as a red light, yellow light, green light, arrows, etc.), management resource 832, and wireless interface 842. The camera device 872 is operative to detect images (via input 862 such as optical signals) of vehicles traveling eastbound on street X towards traffic intersection 711. The wireless interface 842 supports wireless communications with the wireless interface 844 associated with communication device 721. Management resource 832 processes images detected via camera 872 and communicates respective vehicular traffic status information (such as detection of each vehicle and a time when the vehicle is detected via camera 872) over the wireless connectivity 727-2 (such as one or more wireless channels) to the communication device 721.

Communication device 733 (assigned group ID=234) includes camera device 873, traffic light assembly 803 (one or more traffic lights such as a red light, yellow light, green light, arrows, etc.), management resource 833, and wireless interface 843. The camera device 873 is operative to detect images (via input 863 such as optical signals) of vehicles traveling northbound on street Y1 towards traffic intersection 711. The wireless interface 843 supports wireless communications with the wireless interface 844 associated with communication device 721. Management resource 833 processes images detected via camera 873 and communicates respective vehicular traffic status information (such as detection of each vehicle and a time when the vehicle is detected via camera 873) over the wireless connectivity 727-3 (such as one or more wireless channels) to the communication device 721.

Communication device 721 (assigned group ID=234) includes camera device 874, traffic light assembly 804 (one or more traffic lights such as a red light, yellow light, green light, arrows, etc.), management resource 821, and wireless interface 844. The camera device 874 is operative to detect images (via input 864 such as optical signals) of vehicles traveling westbound on street X towards traffic intersection 711. The wireless interface 844 supports wireless communications with each of the wireless interfaces 841, 842, and 843 associated with communication device 721. Management resource 821 processes images detected via camera 874 and stores respective vehicular traffic status information (such as detection of each vehicle and a time when the vehicle is detected via camera 874).

Figure 9:
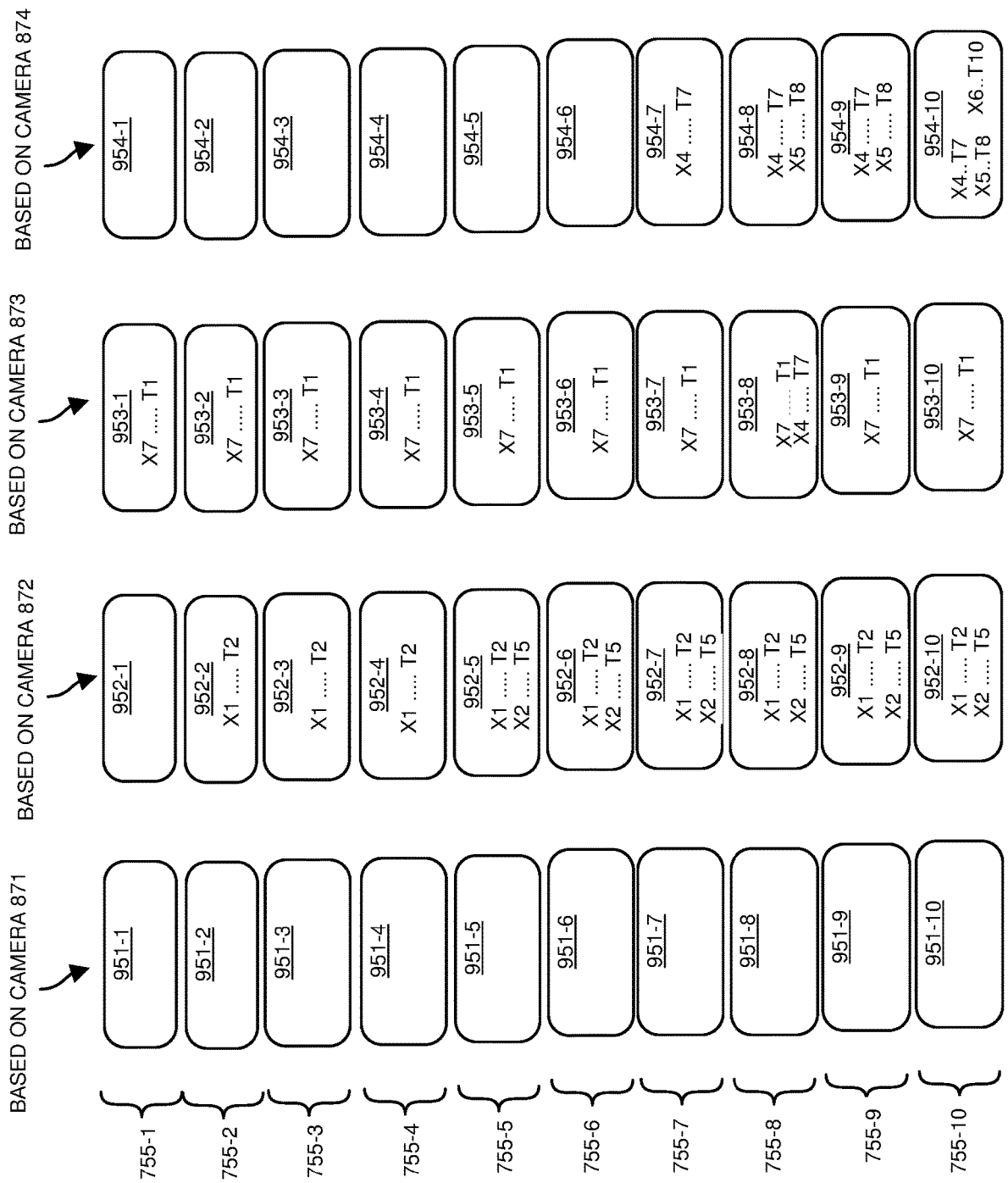
FIG. 9 is an example diagram illustrating vehicular traffic status information associated with a first set of communication devices according to embodiments herein.

Note that the communication device 721 further includes wireless interface 845 supporting wireless communications with wireless base station 150. In one embodiment, as previously discussed, the management resource 821 associated with the communication device 721 collects vehicular traffic status information from each of the communication devices 731, 732, and 733 and itself. The wireless interface 845 communicates the collected vehicular traffic status information 755 over the wireless connectivity 728 (such as one or more wireless channels) to the wireless base station 150. The wireless base station 150 communicates the vehicular traffic status information 755 (such as shown in FIG. 9) over network 190 to the controller 140.

Figure 10:
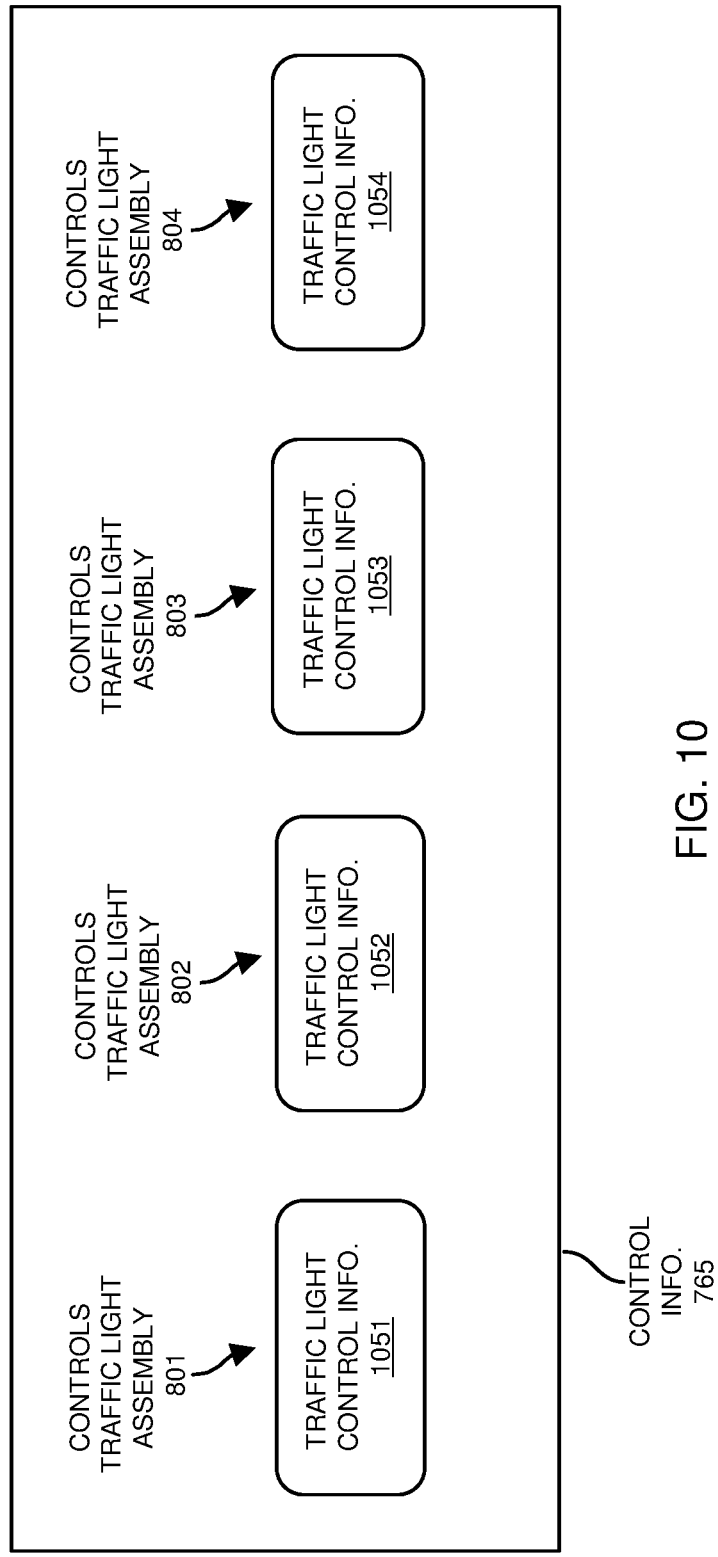
FIG. 10 is an example diagram illustrating generation of control information distributed in a wireless network environment according to embodiments herein.

The controller 140 produces control information 765 (such as shown in FIG. 10) indicating how to control each of the sets of traffic lights (such as traffic light assembly 801, 802, 803, and 804).

Note that, in an autonomous mode, or any other suitable mode, the communication device 721 becomes a synchronization source via synchronization of the communication device 721 to the wireless base station 150 and corresponding wireless network. The communication device 721 transmits a synchronization signal in wireless network environment 100 based on synchronization with the wireless base station 150 and corresponding supported wireless network.

In accordance with further embodiments, the other communication devices 731, 732, and 733 detect presence of the synchronization signal broadcasted from the (master) communication device 721. In one embodiment, synchronization is obtained using a so-called Sidelink Synchronization signal (SLSS) communicated from the communication device 721.

Note that the synchronization signal from the communication device 721 can be configured to include any suitable information or parameters such as Group ID=234 (indicating the group of pre-configured communication devices controlled by the master), multicast addresses, and security information to be used by the recipient to support wireless communications with the communication device 721 over wireless connectivity 727.

In accordance with further embodiments, the communication device 721 implements a discovery request and discovery response message exchange to discover other devices in the vicinity of the master communication device 721. For example, to discover a respective one or more communication devices, the communication device 721 transmits a discovery request to any communication devices assigned a group ID=234. Via communications from the devices that respond because they are assigned the group ID=234, the communication device 721 learns of a specific unique identifier value assigned to each responding communication device.

In accordance with further embodiments, each of the fixed communication devices discover and share traffic information which is used to update timer information.

FIG. 9 is an example diagram illustrating vehicular traffic status information associated with a first set of communication devices according to embodiments herein.

In a similar manner as previously discussed, as the different communication devices detect a respective vehicle in a sample time, the respective communication device records detected vehicles (possibly including their identity) in a respective queue (vehicular traffic status information).

For example, at time T1=0.25, communication device 731 reports vehicular traffic status information 951-1 to the communication device 721; communication device 732 reports vehicular traffic status information 952-1 to the communication device 721; communication device 733 reports vehicular traffic status information 953-1 to the communication device 721. Communication device 721 produces vehicular traffic status information 954-1. The communication device 721 communicates a combination of the vehicular traffic status information 755-1 (vehicular traffic status information 951-1, 952-2, 953-1, and 954-1 over the wireless communication link 128 to the controller 140.

At time T2=0.5, communication device 731 reports vehicular traffic status information 951-2 to the communication device 721; communication device 732 reports vehicular traffic status information 952-2 to the communication device 721; communication device 733 reports vehicular traffic status information 953-2 to the communication device 721. Communication device 721 produces vehicular traffic status information 954-2. The communication device 721 communicates a combination of the vehicular traffic status information 755-2 (vehicular traffic status information 951-2, 952-2, 953-2, and 954-2 over the wireless communication link 128 to the controller 140.

At time T3=0.75, communication device 731 reports vehicular traffic status information 951-3 to the communication device 721; communication device 732 reports vehicular traffic status information 952-3 to the communication device 721; communication device 733 reports vehicular traffic status information 953-3 to the communication device 721. Communication device 721 produces vehicular traffic status information 954-3. The communication device 721 communicates a combination of the vehicular traffic status information 755-3 (vehicular traffic status information 951-3, 952-3, 953-3, and 954-3 over the wireless communication link 128 to the controller 140.

At time T4=1.0 communication device 731 reports vehicular traffic status information 951-4 to the communication device 721; communication device 732 reports vehicular traffic status information 952-4 to the communication device 721; communication device 733 reports vehicular traffic status information 953-4 to the communication device 721. Communication device 721 produces vehicular traffic status information 954-4. The communication device 721 communicates a combination of the vehicular traffic status information 755-4 (vehicular traffic status information 951-4, 952-4, 953-4, and 954-4 over the wireless communication link 128 to the controller 140.

At time T5=1.25, communication device 731 reports vehicular traffic status information 951-5 to the communication device 721; communication device 732 reports vehicular traffic status information 952-5 to the communication device 721; communication device 733 reports vehicular traffic status information 953-5 to the communication device 721. Communication device 721 produces vehicular traffic status information 954-5. The communication device 721 communicates a combination of the vehicular traffic status information 755-5 (vehicular traffic status information 951-5, 952-5, 953-5, and 954-5 over the wireless communication link 128 to the controller 140.

At time T6=1.5, communication device 731 reports vehicular traffic status information 951-6 to the communication device 721; communication device 732 reports vehicular traffic status information 952-6 to the communication device 721; communication device 733 reports vehicular traffic status information 953-6 to the communication device 721. Communication device 721 produces vehicular traffic status information 954-6. The communication device 721 communicates a combination of the vehicular traffic status information 755-6 (vehicular traffic status information 951-6, 952-6, 953-6, and 954-6 over the wireless communication link 128 to the controller 140.

At time T7=1.75, communication device 731 reports vehicular traffic status information 951-7 to the communication device 721; communication device 732 reports vehicular traffic status information 952-7 to the communication device 721; communication device 733 reports vehicular traffic status information 953-7 to the communication device 721. Communication device 721 produces vehicular traffic status information 954-7. The communication device 721 communicates a combination of the vehicular traffic status information 755-7 (vehicular traffic status information 951-7, 952-7, 953-7, and 954-7 over the wireless communication link 128 to the controller 140.

At time T8=2.0, communication device 731 reports vehicular traffic status information 951-8 to the communication device 721; communication device 732 reports vehicular traffic status information 952-8 to the communication device 721; communication device 733 reports vehicular traffic status information 953-8 to the communication device 721. Communication device 721 produces vehicular traffic status information 954-8. The communication device 721 communicates a combination of the vehicular traffic status information 755-8 (vehicular traffic status information 951-8, 952-8, 953-8, and 954-8 over the wireless communication link 128 to the controller 140.

At time T9=2.25, communication device 731 reports vehicular traffic status information 951-9 to the communication device 721; communication device 732 reports vehicular traffic status information 952-9 to the communication device 721; communication device 733 reports vehicular traffic status information 953-9 to the communication device 721. Communication device 721 produces vehicular traffic status information 954-9. The communication device 721 communicates a combination of the vehicular traffic status information 755-9 (vehicular traffic status information 951-9, 952-9, 953-9, and 954-9 over the wireless communication link 128 to the controller 140.

At time T10=2.5, communication device 731 reports vehicular traffic status information 951-10 to the communication device 721; communication device 732 reports vehicular traffic status information 952-10 to the communication device 721; communication device 733 reports vehicular traffic status information 953-10 to the communication device 721. Communication device 721 produces vehicular traffic status information 954-10. The communication device 721 communicates a combination of the vehicular traffic status information 755-10 (vehicular traffic status information 951-10, 952-10, 953-10, and 954-10 over the wireless communication link 128 to the controller 140.

In this manner, the controller 140 is aware of the duration of time that each of the vehicles in respective queues is present at the intersection 111 and waiting to go forward. In one embodiment, the controller 140 controls flow of traffic based on the duration of time and number of vehicles in each particular lane. As previously discussed, note that functionality of the controller 140 can reside in the communication device 721 instead of being remotely located with respect to the communication device 721.

FIG. 10 is an example diagram illustrating generation of control information distributed in a wireless network environment according to embodiments herein.

In one embodiment, based on receiving the vehicular traffic status information 755, the controller produces control information 765. The control information can be any suitable information used to control respective traffic light assemblies associated with the communication devices.

In this example embodiment, the control information 765 includes: i) traffic light control information 1051 that controls traffic light assembly 801, ii) traffic light control information 1052 that controls traffic light assembly 802, iii) traffic light control information 1053 that controls traffic light assembly 803, iv) traffic light control information 1054 that controls traffic light assembly 804.

In one embodiment, upon receipt of the control information 765, the communication device 721 forwards traffic light control information 1051 over wireless connectivity 727-1 to communication device 731 that uses the control information to control traffic lights associated with traffic light assembly 801; the communication device 721 forwards traffic light control information 852 over wireless connectivity 727-2 to communication device 732 that uses such information to control traffic lights associated with traffic light assembly 802; the communication device 721 forwards traffic light control information 1053 over wireless connectivity 727-3 to communication device 733 that uses such information to control traffic lights associated with traffic light assembly 802; the communication device 721 uses traffic light control information 854 to control traffic lights associated with traffic light assembly 804.

Additionally, or alternatively, note that the traffic light control information 765 can be rules applied individually or collectively by the communication devices 721, 731, 732, and 733.

Figure 11:
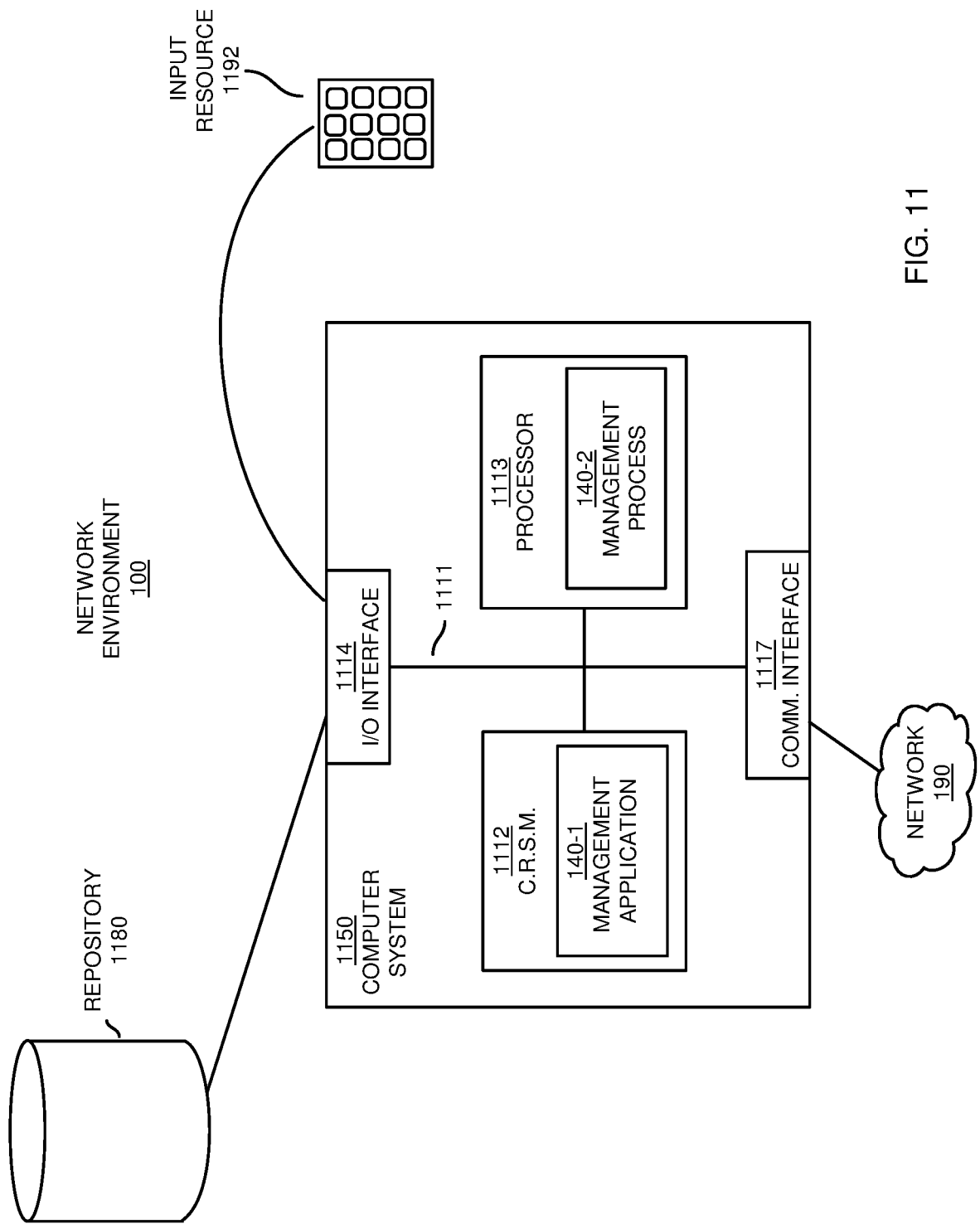
FIG. 11 is an example diagram illustrating example computer hardware and software operable to execute operations according to embodiments herein.

FIG. 11 is an example block diagram of a computer system for implementing any of the operations as previously discussed according to embodiments herein.

Any of the resources (such as wireless base station 150, controller 140, communication management resource, communication devices 131, 132, 133, 121, 731, 732, 733, etc.) as discussed herein can be configured to include computer processor hardware and/or corresponding executable instructions to carry out the different operations as discussed herein.

As shown, computer system 1150 of the present example includes interconnect 1111 coupling computer readable storage media 1112 such as a non-transitory type of media (which can be any suitable type of hardware storage medium in which digital information can be stored and or retrieved), a processor 1113 (computer processor hardware), I/O interface 1114, and a communications interface 1117.

I/O interface(s) 1114 supports connectivity to repository 1180 and input resource 1192.

Computer readable storage medium 1112 can be any hardware storage device such as memory, optical storage, hard drive, floppy disk, etc. In one embodiment, the computer readable storage medium 1112 stores instructions and/or data.

As shown, computer readable storage media 1112 can be encoded with management application 140-1 (e.g., including instructions) in a respective wireless station to carry out any of the operations as discussed herein.

During operation of one embodiment, processor 1113 accesses computer readable storage media 1112 via the use of interconnect 1111 in order to launch, run, execute, interpret or otherwise perform the instructions in management application 140-1 stored on computer readable storage medium 1112. Execution of the management application 140-1 produces scheduler resource process 140-2 to carry out any of the operations and/or processes as discussed herein.

Those skilled in the art will understand that the computer system 1150 can include other processes and/or software and hardware components, such as an operating system that controls allocation and use of hardware resources to execute management application 140-1.

In accordance with different embodiments, note that computer system may reside in any of various types of devices, including, but not limited to, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 1150 may reside at any location or can be included in any suitable resource in any network environment to implement functionality as discussed herein.

Functionality supported by the different resources will now be discussed via flowcharts in FIGS. 12 and 13. Note that the steps in the flowcharts below can be executed in any suitable order.

Figure 12:
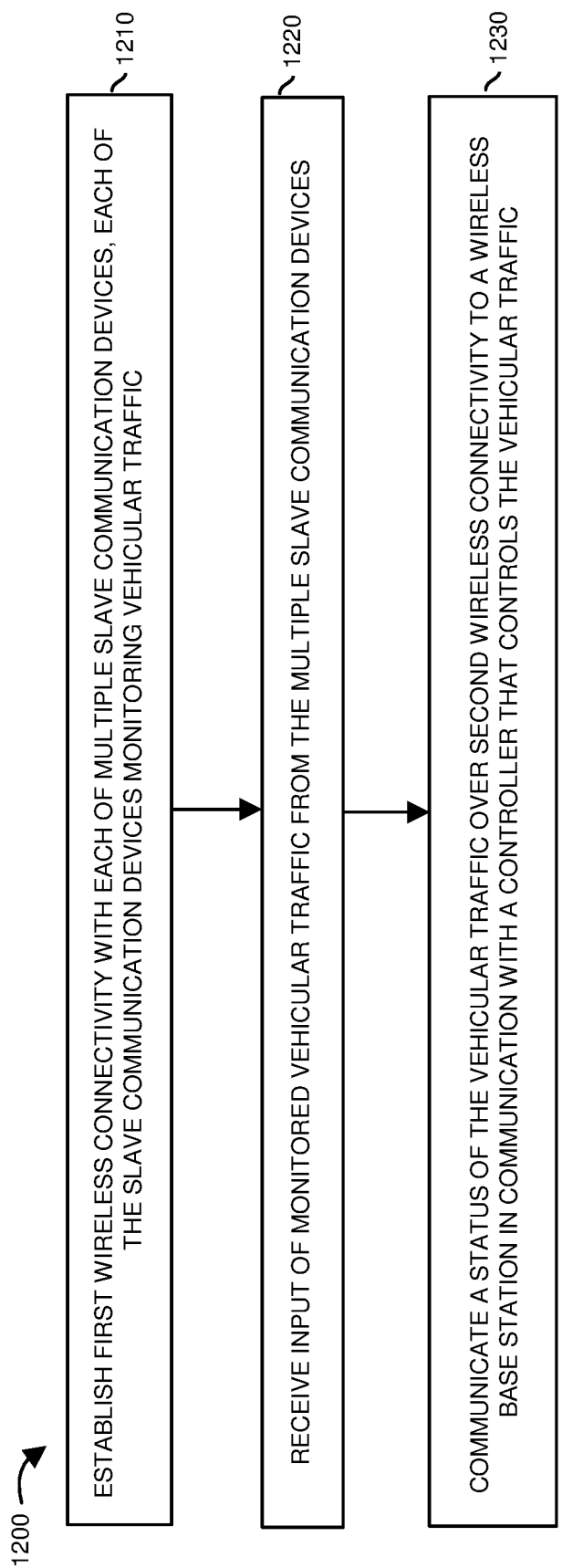
FIG. 12 is an example diagram illustrating a method according to embodiments herein.

FIG. 12 is a flowchart 1200 illustrating an example method according to embodiments herein. Note that there will be some overlap with respect to concepts as discussed above.

In processing operation 1210, the (master) communication device 121 establishes first wireless connectivity 127 with each of multiple (slave) communication devices 131, 132, and 133. In one embodiment, each of the (slave) communication devices monitors vehicular traffic at a particular street intersection 111.

In processing operation 1220, the (master) communication device 121 receives input of monitored vehicular traffic from the multiple (slave) communication devices 731, 732, and 733.

In processing operation 1230, the (master) communication device 121 communicates a status of the vehicular traffic over second wireless connectivity 128 to a wireless base station 150 in communication with a controller 140 (management resource) that controls the vehicular traffic at traffic intersection 111.

Figure 13:
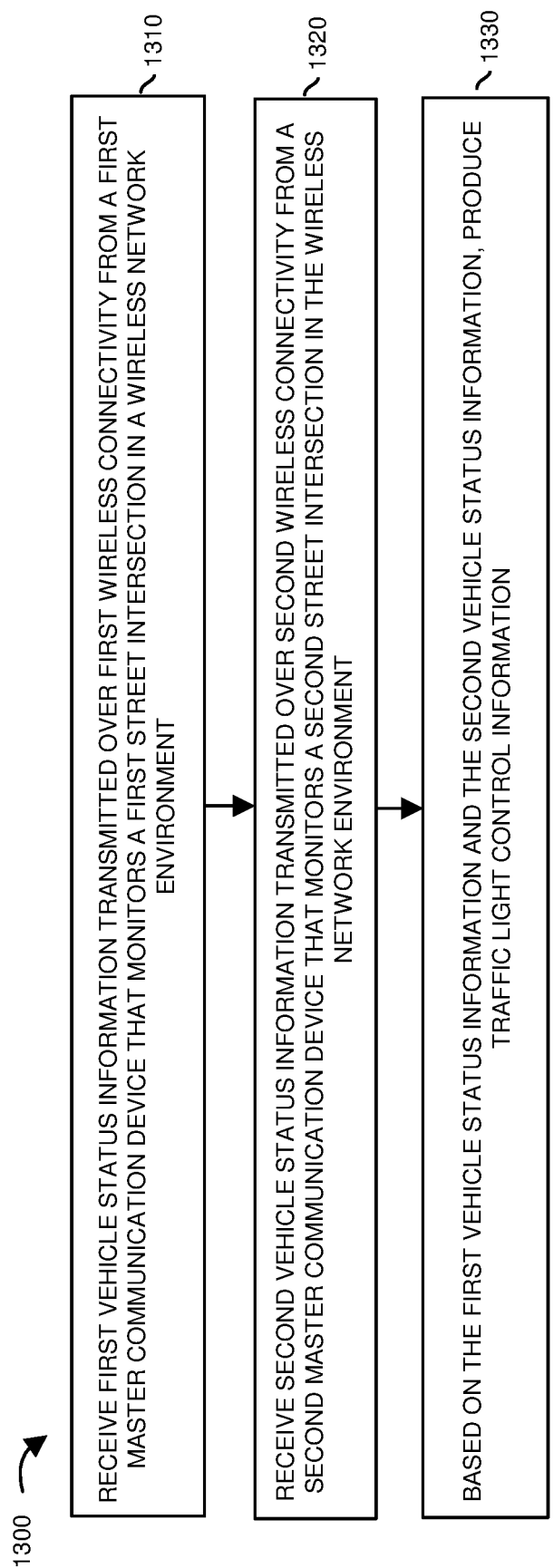
FIG. 13 is an example diagram illustrating a method according to embodiments herein.

FIG. 13 is a flowchart 1300 illustrating an example method according to embodiments herein. Note that there will be some overlap with respect to concepts as discussed above.

In processing operation 1310, the traffic light controller 140 receives first vehicle status information 155 transmitted over first wireless connectivity 128 from a first master communication device that monitors a first street intersection 111 in a wireless network environment 100.

In processing operation 1320, the traffic light controller 140 receives second vehicle status information 755 transmitted over second wireless connectivity from a second master communication device that monitors a second street intersection 711 in the wireless network environment 100.

In processing operation 1330, based on the first vehicle status information and the second vehicle status information, the traffic light controller 140 produces traffic light control information.

Note again that techniques herein are well suited to facilitate control of traffic lights via a novel wireless system. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

The invention claimed is:

1. A method comprising:
   via a master communication device in a network environment:
   establishing first wireless connectivity with each of multiple slave communication devices, each of the slave communication devices monitoring vehicular traffic at a first traffic intersection;
   receiving input of monitored vehicular traffic from the multiple slave communication devices; and
   communicating a status of the vehicular traffic over second wireless connectivity to a wireless base station in communication with a controller that controls the vehicular traffic at the first traffic intersection.

2. The method as in claim 1 further comprising:
   at the master communication device:
   in response to communicating the status of the vehicular traffic over the second wireless connectivity to the wireless base station, receiving control information from the controller via communications from the wireless base station, the control information indicating how to control a respective traffic light assigned to each of the multiple slave communication devices; and
   communicating the control information to the slave communication devices.

3. The method as in claim 2 further comprising: via the control information, controlling settings of the respective traffic light to which a corresponding slave communication device is assigned to control.

4. The method as in claim 1, wherein the first wireless connectivity supports persistent connectivity between the master communication device and each of the multiple slave communication devices.

5. The method as in claim 1, wherein establishing the first wireless connectivity with each of the multiple slave communication devices includes:
   at the master communication device:
   detecting presence of the multiple slave communication devices in the network environment, each of the slave communication devices assigned a group identifier value served by the master communication device;
   requesting allocation of wireless resources for the multiple slave communication devices; and
   notifying the multiple slave communication devices of the allocation of wireless resources.

6. The method as in claim 1 further comprising:
   at the master communication device:
   acquiring synchronization with respect to a wireless network in which the wireless base station resides; and
   synchronizing each of the multiple slave communication devices to the wireless network.

7. The method as in claim 1, wherein the first wireless connectivity supports communications in accordance with a D2D (Device-to-Device) protocol.

8. The method as in claim 1, wherein the second wireless connectivity is persistent and supports communications in accordance with an LTE (Long Term Evolution) narrow band wireless communication protocol.

9. The method as in claim 1, wherein receiving the input of monitored vehicular traffic from the multiple slave communication devices includes:
   receiving first status information from a first slave communication device of the multiple slave communication devices, the first status information indicating a status of first vehicles traveling in a first direction through the first traffic intersection associated with the master communication device; and
   receiving second status information from a second slave communication device of the multiple slave communication devices, the second status information indicating a status of second vehicles traveling in a second direction through the first traffic intersection.

10. The method as in claim 9, wherein the first status information indicates a number of vehicles in each of multiple lanes traveling in the first direction through the first traffic intersection; and
wherein the second status information indicates a number of vehicles in each of multiple lanes traveling in the second direction through the first traffic intersection.

11. The method as in claim 1, wherein the master communication device is assigned a unique identifier value associated with the first traffic intersection; and
wherein each of the multiple slave communication devices is assigned the unique identifier value associated with the first traffic intersection.

12. The method as in claim 11, wherein establishing the first wireless connectivity with each of the multiple slave communication devices includes:
transmitting a discovery request message from the master communication device; and
in response to transmitting the discovery request message:
i) receiving a first discovery response from a first slave communication device of the multiple slave communication devices, the first slave discovery response message indicating that the first slave communication device is assigned the unique identifier value, and ii) receiving a second discovery response from a second slave communication device of the multiple slave communication devices, the second slave discovery response message indicating that the second slave communication device is assigned the unique identifier value.

13. The method as in claim 12 further comprising:
receiving allocation of wireless resources for the multiple slave communication devices; and
communicating allocation of the wireless resources to the multiple slave communication devices.

14. The method as in claim 12, wherein the first slave communication device detects first vehicle traffic from a first direction at the first traffic intersection;
wherein the second slave communication device detects second vehicle traffic from a second direction at the first traffic intersection; and
wherein receiving input of monitored vehicular traffic from the multiple slave communication devices includes: i) receiving first vehicle traffic information from the first slave communication device, the first vehicle traffic information indicating the first vehicle traffic, and ii) receiving second vehicle traffic information from the second slave communication device, the second vehicle traffic information indicating the second vehicle traffic.

15. The method as in claim 14, wherein communicating the status of the vehicular traffic over the second wireless connectivity to the wireless base station includes:
communicating the first vehicle traffic information and the second vehicle traffic information from the master communication device through the wireless base station to a controller.

16. The method as in claim 15 further comprising:
at the master communication device: i) receiving first traffic light control information generated by the controller, the first traffic light control information indicating traffic light settings associated with the first slave communication device, the first traffic light control information generated based on the first vehicle traffic information, and ii) communicating the first traffic light control information to the first slave communication device; and
at the master communication device: i) receiving second traffic light control information generated by the controller, the second traffic light control information indicating traffic light settings associated with the second slave communication device, the second traffic light control information generated based on the second vehicle traffic information, and ii) communicating the second traffic light control information to the second slave communication device.

17. The method as in claim 16 further comprising:
via the first slave communication device, controlling a first set of traffic lights at the first traffic intersection as indicated by the first traffic light control information; and
via the second slave communication device, controlling a second set of traffic lights at the first traffic intersection as indicated by the second traffic light control information.

18. The method as in claim 1 further comprising:
from the master communication device, communicating configuration information to a first slave communication device of the multiple slave communication devices;
in response to detecting that the master communication device experiences a failure, switching over operation of the first slave communication device to be a substitute master communication device in control of the second slave communication device.

19. The method as in claim 1, wherein receiving input of monitored vehicular traffic from the multiple slave communication devices includes:
for a first sample timeframe of multiple timeframes of the slave communication devices monitoring traffic: i) receiving first vehicle traffic information, the first vehicle traffic information received from a first slave communication device of the multiple slave communication devices, the first vehicle traffic information indicating detection of a first vehicle in the first sample timeframe; and ii) receiving second vehicle traffic information, the second vehicle traffic information received from a second slave communication device of the multiple slave communication devices, the second vehicle traffic information indicating detection of a second vehicle in the first sample timeframe.

20. The method as in claim 19, wherein receiving input of monitored vehicular traffic from the multiple slave communication devices includes:
for a second sample timeframe of multiple timeframes of the slave communication devices monitoring traffic: i) receiving third vehicle traffic information, the third vehicle traffic information received from the first slave communication device, the third vehicle traffic information indicating detection of the first vehicle and a third vehicle in the second sample timeframe; and ii) receiving fourth vehicle traffic information, the fourth vehicle traffic information received from the second slave communication device, the fourth vehicle traffic information indicating detection of the second vehicle in the second sample timeframe.

21. The method as in claim 1, wherein receiving input of monitored vehicular traffic from the multiple slave communication devices includes:
i) receiving first vehicle traffic information from a first slave communication device of the multiple slave communication devices, the first vehicle traffic information indicating detection of a first vehicle and a corresponding first time stamp indicating when the first vehicle was detected, and ii) receiving second vehicle traffic information from a second slave communication device of the multiple slave communication devices, the second vehicle traffic information indicating detection of a second vehicle and a corresponding second time stamp when the second vehicle was detected.

22. A system comprising:
a master communication device;
multiple slave communication devices; and
the master communication device operative to:
  establish first wireless connectivity with each of the multiple slave communication devices, each of the slave communication devices monitoring vehicular traffic at a first traffic intersection in a wireless network environment;
  receive input of monitored vehicular traffic from the multiple slave communication devices; and
  communicate a status of the vehicular traffic over second wireless connectivity to a wireless base station in communication with a controller that controls the vehicular traffic at the first traffic intersection.

23. The system as in claim 22, wherein the master communication device is further operative to:
  in response to communicating the status of the vehicular traffic over the second wireless connectivity to the wireless base station, receive control information from the controller via communications through the wireless base station, the control information indicating how to control a respective traffic light assigned to each of the multiple slave communication devices; and
  communicate the control information to the slave communication devices.

24. The system as in claim 23, wherein the control information controls settings of the respective traffic light to which a corresponding slave communication device is assigned to control.

25. The system as in claim 22, wherein the first wireless connectivity supports persistent connectivity between the master communication device and each of the multiple slave communication devices.

26. The system as in claim 22, wherein the master communication device is further operative to:
  detect presence of the multiple slave communication devices in the network environment, each of the slave communication devices assigned a group identifier value served by the master communication device;
  request allocation of wireless resources for the multiple slave communication devices; and
  notify the multiple slave communication devices of the allocation of wireless resources.

27. The system as in claim 22, wherein the master communication device is further operative to:
  acquire synchronization with respect to a wireless network in which the wireless base station resides; and
  synchronize each of the multiple slave communication devices to the wireless network.

28. The system as in claim 22, wherein the first wireless connectivity supports communications in accordance with a D2D (Device-to-Device) protocol.

29. The system as in claim 22, wherein the second wireless connectivity is persistent and supports communications in accordance with an LTE (Long Term Evolution) narrow band wireless communication protocol.

30. The system as in claim 22, wherein the master communication device is further operative to:
  receive first status information from a first slave communication device of the multiple slave communication devices, the first status information indicating a status of first vehicles traveling in a first direction through the first traffic intersection associated with the master communication device; and
  receive second status information from a second slave communication device of the multiple slave communication devices, the second status information indicating a status of second vehicles traveling in a second direction through the first traffic intersection.

31. The system as in claim 30, wherein the first status information indicates a number of vehicles in each of multiple lanes traveling in the first direction through the first traffic intersection; and
  wherein the second status information indicates a number of vehicles in each of multiple lanes traveling in the second direction through the first traffic intersection.

32. A method comprising:
at a traffic light controller:
  receiving first vehicle status information transmitted over first wireless connectivity from a first master communication device that monitors a first street intersection in a wireless network environment via first traffic monitor information wirelessly received from a first set of slave communication devices operative to collectively monitor the first street intersection;
  receiving second vehicle status information transmitted over second wireless connectivity from a second master communication device that monitors a second street intersection in the wireless network environment via second traffic monitor information wirelessly received from a second set of slave communication devices operative to collectively monitor the second street intersection; and
  based on the first vehicle status information and the second vehicle status information, producing traffic light control information.

33. The method as in claim 32, wherein the traffic light control information includes first traffic light control information and second traffic light control information;
  wherein the first traffic light control information controls a first set of traffic lights, the first set of traffic lights residing at the first street intersection; and
  wherein the second traffic light control information controls a second set of traffic lights, the second set of traffic lights residing at the second street intersection.

34. The method as in claim 32, wherein the traffic light control information includes first traffic light control information communicated to the first master communication device, the first traffic light control information controlling a first set of traffic lights at the first street intersection; and
  wherein the traffic light control information includes second traffic light control information communicated to the second master communication device, the second traffic light control information controlling a second set of traffic lights at the second street intersection.

35. The method as in claim 32, wherein the first vehicle status information includes a compilation of first vehicular traffic status information from the first set of slave communication devices in wireless communication with the first master communication device; and
  wherein the second vehicle status information includes a compilation of second vehicular traffic status information from the second set of slave communication devices in wireless communication with the second master communication device.

36. The method as in claim 35, wherein the first master communication device communicates with the first set of slave communication devices in accordance with a first wireless communication protocol;
wherein the second master communication device communicates with the second set of slave communication devices in accordance with the first wireless communication protocol; and
wherein both the first master communication device and the second master communication device communicate the first vehicular traffic status information and the second vehicular traffic status information to a wireless base station via a second wireless communication protocol, the wireless base station in communication with the traffic light controller.

37. Computer-readable storage hardware having instructions stored thereon, the instructions, when carried out by computer processor hardware, cause the computer processor hardware to:
establish first wireless connectivity with each of multiple slave communication devices, each of the slave communication devices monitoring vehicular traffic at the first traffic intersection;
receive input of monitored vehicular traffic from the multiple slave communication devices; and
communicate a status of the vehicular traffic over second wireless connectivity to a wireless base station in communication with a controller that controls the vehicular traffic at the first traffic intersection.

* * * * *